United States Patent [19]

Theile

[11] Patent Number: 5,770,934
[45] Date of Patent: Jun. 23, 1998

[54] METHOD FOR THE CLOSED-LOOP CONTROL OF AN AUTOMATIC DOOR WHICH IS PROPELLED BY A DRIVE MOTOR

[75] Inventor: Ulrich Theile, Hagen, Germany

[73] Assignee: DORMA GmbH & Co. KG, Ennepetal, Germany

[21] Appl. No.: 582,848

[22] Filed: Dec. 29, 1995

Related U.S. Application Data

[63] Continuation-in-part of PCT/DE95/00169, Feb. 10, 1995.

[30] Foreign Application Priority Data

May 2, 1994 [DE] Germany ............................ 44 15 164.0

[51] Int. Cl.[6] ...................................................... H02D 1/04
[52] U.S. Cl. .......................... 318/469; 318/466; 361/87; 49/28
[58] Field of Search ................................. 361/31, 87, 78; 318/445–478, 280–300; 160/1, 7; 49/139, 348–349, 28

[56] References Cited

U.S. PATENT DOCUMENTS

| | | | |
|---|---|---|---|
| 4,338,553 | 7/1982 | Scott ........................................ | 318/466 |
| 4,386,398 | 5/1983 | Matsuoka et al. ....................... | 318/466 |
| 4,638,433 | 1/1987 | Schindler ................................ | 318/264 |
| 4,855,653 | 8/1989 | Lemirande .............................. | 318/282 |
| 5,278,480 | 1/1994 | Murray .................................... | 318/626 |

FOREIGN PATENT DOCUMENTS

| | | |
|---|---|---|
| 0468361 | 1/1992 | European Pat. Off. . |
| 0548505 | 6/1993 | European Pat. Off. . |
| 0590227 | 4/1994 | European Pat. Off. . |
| 3921158 | 1/1991 | Germany . |
| 4206272 | 9/1993 | Germany . |
| 9307326 | 9/1993 | Germany . |
| 4214998 | 11/1993 | Germany . |

*Primary Examiner*—David S. Martin
*Attorney, Agent, or Firm*—Nils H. Ljungman and Associates

[57] ABSTRACT

A process for the closed-loop control and thus for the limitation of the maximum allowable force on the primary and secondary closing edges of an automatic door. This object is achieved by conducting a verification of the drive system before each movement of the door panel. During this verification, the actual value of the motor current during the startup phase is verified by means of a stored motor torque characteristic.

17 Claims, 13 Drawing Sheets

METHOD FOR THE CLOSED-LOOP CONTROL OF AN AUTOMATIC DOOR WHICH IS PROPELLED BY A DRIVE MOTOR

CONTINUING APPLICATION DATA

This application is a continuation-in-part application of International Application No. PCT/DE 95/00169, filed on Feb. 10, 1995, which claims priority from Federal Republic of Germany Application No. P 44 15 164.0, filed on May 2, 1994. International Application No. PCT/DE 95/00169 was pending as of the filing date of this application and designated the USA as a designated state.

BACKGROUND OF THE INVENTION

1. Field of the Invention

The present invention relates to a method for the closed-loop control of an automatic door which is propelled by a drive motor, in which the beginning of the movement cycle is activated by a continuous signal or at least one sensor signal. The door in question can be one of the following types, for example: sliding door, curved panel sliding door, folding door, three-panel folding door, revolving door, etc. and is equipped with a programmable electronic control unit which contains a microprocessor. Since people travel through the above-mentioned types of automatic doors, it is important to guarantee a maximum degree of safety for these doors, namely, so that the doors pose no risk of trapping people between the edges of the door panels which move toward one another as they close. These risks can include, for example, situations in which the persons using the door can become jammed between the edges of the panels, or situations in which they can be injured by an excessive force generated by the door propulsion system between the edge of the door and the edge of the opposite surface. Therefore it is necessary to guarantee the safety of such closing operations, which can of course be accomplished by installing a complex and expensive system of sensors, or also by adopting measures which limit and monitor the force of the propulsion unit. This force limitation can be achieved, for example, if the power of the drive system is so weak that the drive motor is unable to exceed a specified force, but such a limitation results in an unsatisfactorily slow movement of the door panels.

2. Background Information

European Patent Application 0 468 361 relates to a system which limits the closing force on the closing edge of a moving element. By means of a redundant system of measurement circuits, and in addition to the motor current which is measured by means of a measurement resistance, the setpoint of the maximum motor current is transmitted to redundant measurement systems, where it is processed. When a specified motor current is exceeded, a shutdown pulse is transmitted to the electronic control system of the drive. The system is reliable and inherently safe, on account of the redundant realization.

Another European Patent Application 0 548 505 relates to a method and an apparatus for the determination of the dynamic mass of elevator doors. This method can be used at any closing speed to determine the corresponding kinetic energy of the door panel, thereby making it possible to define the kinetic energy of the door panel, and to analogously determine the kinetic energy on the closing edge. Conversely, on the basis of the kinetic energy determined, this system makes it possible to specify a maximum allowable closing speed which lies in the allowable range for such doors.

German Patent No. 42 06 272 A1 relates to a starting method and a device for the operation of a controlled and/or an uncontrolled sliding (or perhaps swinging) door. In this method, the parameters are determined by the intelligent control system of the door itself once, at the beginning of operation when the door is turned on, and are then stored in a non-volatile memory.

German Laid Open Patent Application No. 39 21 158 relates to a drive device for opening and closing an articulated door. This system includes a control device which limits the motor current on the basis of stored maximum setpoints for the motor current. These maximum setpoints thereby correspond to the maximum allowable door closing forces. Changes in parameters caused by factors of any type are not taken into consideration.

German Patent No. 42 14 998 A1 discloses a power consumption monitoring system for a garage door during opening and closing. The power consumption monitoring system is connected to a safety monitoring system which disengages the drive when a maximum power consumption is exceeded. The door-specific power consumptions have previously been stored in a memory as a function of the movement of the door during normal operation.

OBJECT OF THE INVENTION

One object of the present invention, when a powerful drive unit is used, i.e., a drive unit which consists of the motor, the control system and the power supply, and is capable of transmitting a force which is significantly higher than necessary to the door panel or panels between the primary and secondary closing edges, is to guarantee the safe operation of an automatic door, without the need to install additional safety equipment.

SUMMARY OF THE INVENTION

The invention teaches that this object can be achieved if, at the beginning of an operating cycle, i.e., when the door panels are opened and again when they are closed, a verification is conducted, on the basis of a sequential program, of the torque (or moment) curve of the drive motor for the entire propulsion system, whereby in the startup phase, a value higher than the stored setpoint of the motor current is allowable for a brief period. The sequential program guarantees the maximum degree of safety for the persons using the door.

The switched mode power supply which corresponds to such a drive system is generally capable of generating a greater force than is allowable between the primary closing edge and the secondary closing edge. Powerful switched mode power supplies are therefore used, so that the movement of the door panels can be completed in a reasonable length of time, i.e., it must be possible for such a door to open quickly.

The invention teaches that the motor current is a parameter for the power of the connected drive motor. The determination of the motor current and thus the determination of the characteristic of the connected drive motor is a value which is representative of the torque this motor can generate, and is therefore a specific value. The motor current can either be determined by a programming process, or the system can measure the current itself by means of a measurement or a calculation of the internal resistance of the motor, since the current operating voltage is a known quantity. The known or determined values are stored, for example, in an $E^2$-prom (or EEPROM).

Within a specified length of time, the door tests itself automatically every time it moves, namely in the limit positions, i.e., when the door panel is in the closed or open position. Therefore, before any movement takes place, a verification of the entire system is conducted which, as a result of the simultaneous limitation of the torque of the drive motor, limits the force on the closing edges. A sequential program thereby performs a calibration between the startup and subsequent operation of a door, e.g., before the beginning of any movement, there is a verification of the torque characteristic, because such a verification will immediately detect any drift from the normal parameters of the hardware. The user will be unaware of the length of time required to perform such a verification, since the test is performed in very brief periods of time. Such a test procedure can take place as follows:

- In the starting phase, the setpoint for the motor current is set to a value which is greater than the maximum allowable stored value.
- The motor is started.
- The actual value of the motor current is measured.
- There is a verification of the maximum measured value of the motor current for a maximum time base $t_1$.
- The measured value is set to a value which is less than the maximum allowable setpoint.
- Is the measured value at a value which is below the maximum allowable setpoint?
- Has the maximum time $t_2$ elapsed?
- Test positive.
- Test negative.

By means of the first setpoint step-change when the motor is turned on, current flows through the drive motor and the motor current reaches a limit which is greater than the maximum allowable actual value. This limit is reached at the beginning of the opening phase. The setpoint is then reduced, which results in a reduction of the motor current to a point which is less than the limit value of the torque characteristic. This entire process should preferably be completed within a specified period of time. If an error occurs, the error is reported, and the door is immediately and automatically switched into a safe status. Such errors can, for example, include a sudden increase or decrease in the speed of the door panel, or the occurrence of an obstacle. In this manner, any deviations which occur outside the specified times are reliably detected, because in normal operation, the control system keeps the drive system below the torque curve and thus in the safe operating range.

In summary, one aspect of the invention resides broadly in a method for testing the operation of an automatic door, the automatic door including at least one displaceable door panel and a drive system for displacing the door panel to permit access through the automatic door, the method comprising the steps of: providing memory means for storing data, storing in the memory means at least one characteristic of the drive system, prior to each displacement of the at least one displaceable door panel, determining at least one operational characteristic of the drive system, comparing the determined operational characteristic of the drive system to the at least one characteristic of the drive system stored in the memory means, and if the determined operational characteristic is outside of at least one given range of the at least one characteristic of the drive system stored in the memory means, then at least temporarily preventing the drive system from displacing the at least one displaceable door panel.

A further aspect of the invention resides broadly in an apparatus for testing the operation of an automatic door, the automatic door including at least one displaceable door panel and a drive system for displacing the door panel to permit access through the automatic door, said apparatus comprising: memory means for storing data, means for storing in the memory means at least one characteristic of the drive system, means for determining, prior to each displacement of the at least one displaceable door panel, at least one operational characteristic of the drive system, means for comparing the determined operational characteristic of the drive system to the at least one characteristic of the drive system stored in the memory means, and means for at least temporarily preventing the drive system from displacing the at least one displaceable door panel if the determined operational characteristic is outside of at least one given range of the at least one characteristic of the drive system stored in the memory means.

BRIEF DESCRIPTION OF THE DRAWINGS

The invention is explained in greater detail below with reference to a preferred embodiment which is illustrated schematically in the accompanying figures, wherein.

DESCRIPTION OF THE PREFERRED EMBODIMENT

On the basis of a sequential program which is stored in the memory which is part of the microprocessor, the system guarantees that the motor current may not exceed a maximum specified value for more than a specified time base. The magnitude of the motor current is a measurement which is representative of the force which can occur between the primary and secondary closing edges of an automatic door. For example, a sequential program can be designed so that, in the startup phase, current is applied to the drive motor by means of a control command. As noted above, the connected power supply which is responsible for supplying power to the drive motor is generally sized with some reserve capacity (that is, oversized), so that the door panel, which is quite heavy, can be placed in motion quickly. Thus the motor can be accelerated as indicated by the maximum curve of its torque characteristic without exceeding the allowable force. But at the same time, the motor current is measured continuously, and on the basis of the sequential program, the motor current is preferably reduced at the point where it exceeds the torque curve. Because the setpoint is reduced, the measured value of the motor current is also simultaneously reduced, and thus there is a reduction in the forces which occur. If the motor current were to increase above the maximum allowable value while the door was in operation, the drive would be shut down by means of a second disconnect system. This feature guarantees that the door panels pose no danger to the persons using the door.

Frequently, one and the same open-loop control unit, and thus also the closed-loop control unit, is used for different types of doors, which means that the motor which is connected will be different, as a function of the weights of the door panels in question or the requirements of the specific site. For this reason, the motor characteristics are preferably stored in a non-volatile memory, which can be an $E^2$-PRODI (or "EEPROM", e.g., electrically erasable programmable read only memory), for example. But it is also possible that the door system can use its intelligent capabilities to measure the motor characteristics by means of a learning cycle, and the values determined during this learning cycle are also stored in a non-volatile memory, where they can be called up and processed by the microprocessor which is part of the system. In addition to the measurement of the motor characteristics and thus of the motor current, the motor voltage is also preferably measured.

Figure 1:
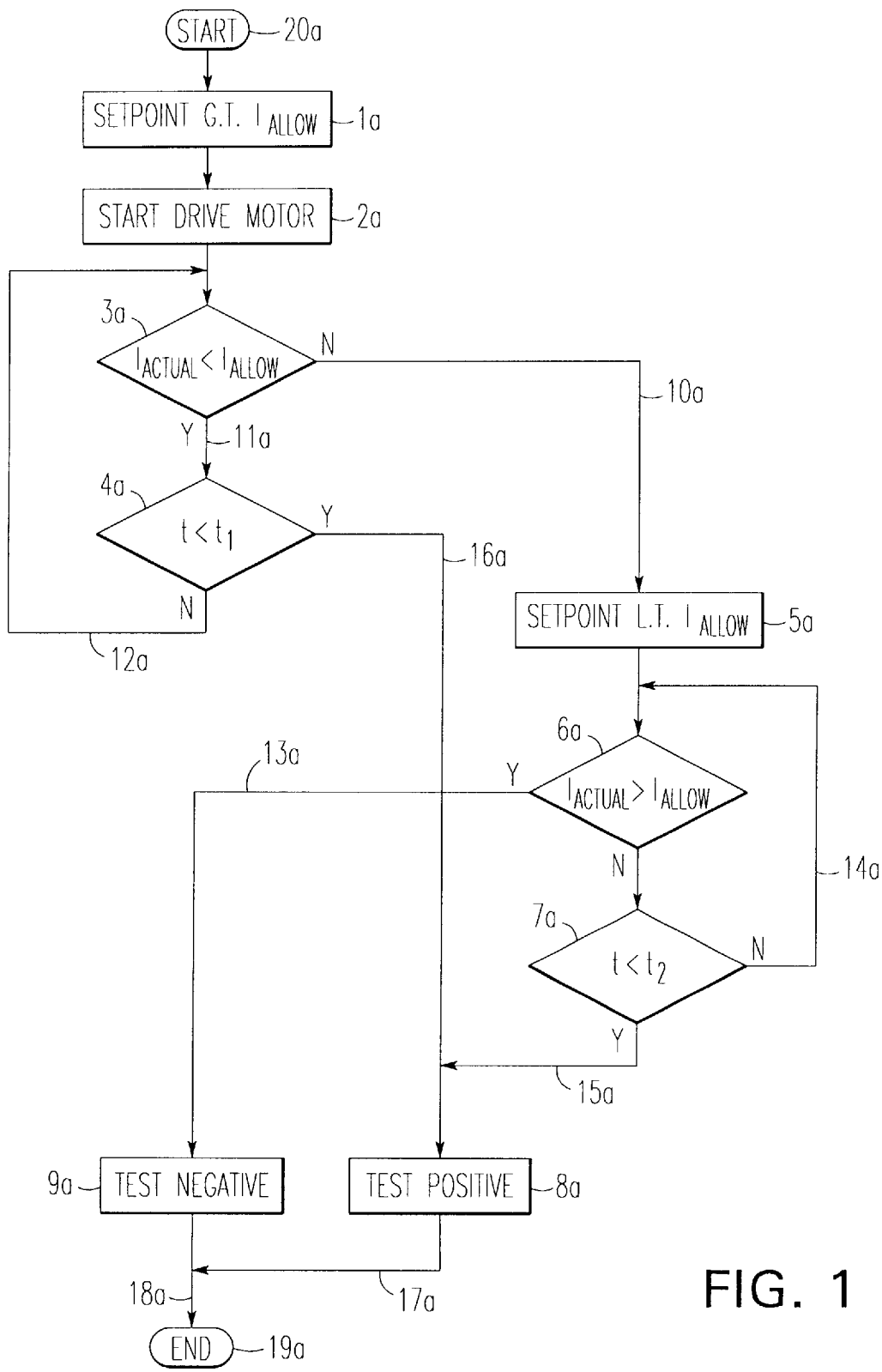
FIG. 1 is a flow chart of a test procedure during the starting phase.

The invention teaches a method which makes it possible, on account of a specified, selectable time interval, to guarantee that the drive is tested to verify that the maximum forces on the primary and secondary closing surfaces are within parameters before each operating cycle. FIG. 1 is a flow diagram in which a starting command 20a is given which activates the setpoint selection 1a. The setpoint selection 1a specifies the maximum allowable motor current, which lies above the allowable current for normal operation. This maximum allowable motor current is in turn stored in a non-volatile memory, after it has been measured in a learning cycle or after it has been programmed. Then the drive motor is started by the start command 2a. By performing a measurement of the motor current 3a, the magnitude of the motor current, which increases during the starting phase, can be determined. If the actual value of the motor current is below the maximum allowable value, this value is transmitted by means of the selection 10a to a subroutine which performs a setpoint comparison 5a. The setpoint of the motor current is reprocessed in an actual value comparison element 6a. If the actual value is greater than the allowable value, by means of the message "lower actual value" 13a, this fact is forwarded to the "test negative" evaluation element 9a. Because the test has produced a negative result, a command 18a goes to the end of the test program 19a. If a time has been specified, this test can then be repeated either immediately or at a later time, depending on the customer's requirements. But if the current of the motor is at a value which is less than the maximum allowable value, this current is transmitted by the sequential program to the time base 7a $t_2$. If the total amount of time required for the sequence is within the specified time $t_2$, this fact is reported to the test evaluation element 8a by means of the test report element 15a. The test evaluation element 8a indicates that the test has been conducted with a positive result, and thus the drive is operating within the requirements. This fact is then reported via the command element 17a to the end of the test 19a. It is not necessary to repeat the test at a later time for this direction of operation. But if the motor current is on a level which is higher than allowed, this fact is reported by means of the time base 7a and the feedback loop 14a to the actual value element 6a of the motor current. But if the motor current is reduced within the period $t_2$ of the time base 7a, then as described above, a positive test result is reported. If the drive is not capable of keeping the motor current within the specified limits in the specified length of time $t_2$, then this fact is reported to the program by means of the actual value element 6a and the reporting element 13a as a negative test result 9a.

There is another branch of the program, in which the detection of the motor current 3a at a level which is below the allowable value is reported by means of the selection element 11a to the time base 4a $t_1$. If the time has not yet elapsed, this fact is reported by means of the test reporting element 16a to the test evaluation element 8a as a positive result of the test. But if the test is negative within the time base 4a, this fact is reported via the feedback loop 12a to the motor current measurement element 3a, so that a decision can be made by the program between a positive or a negative test within the specified time.

Figure 2:
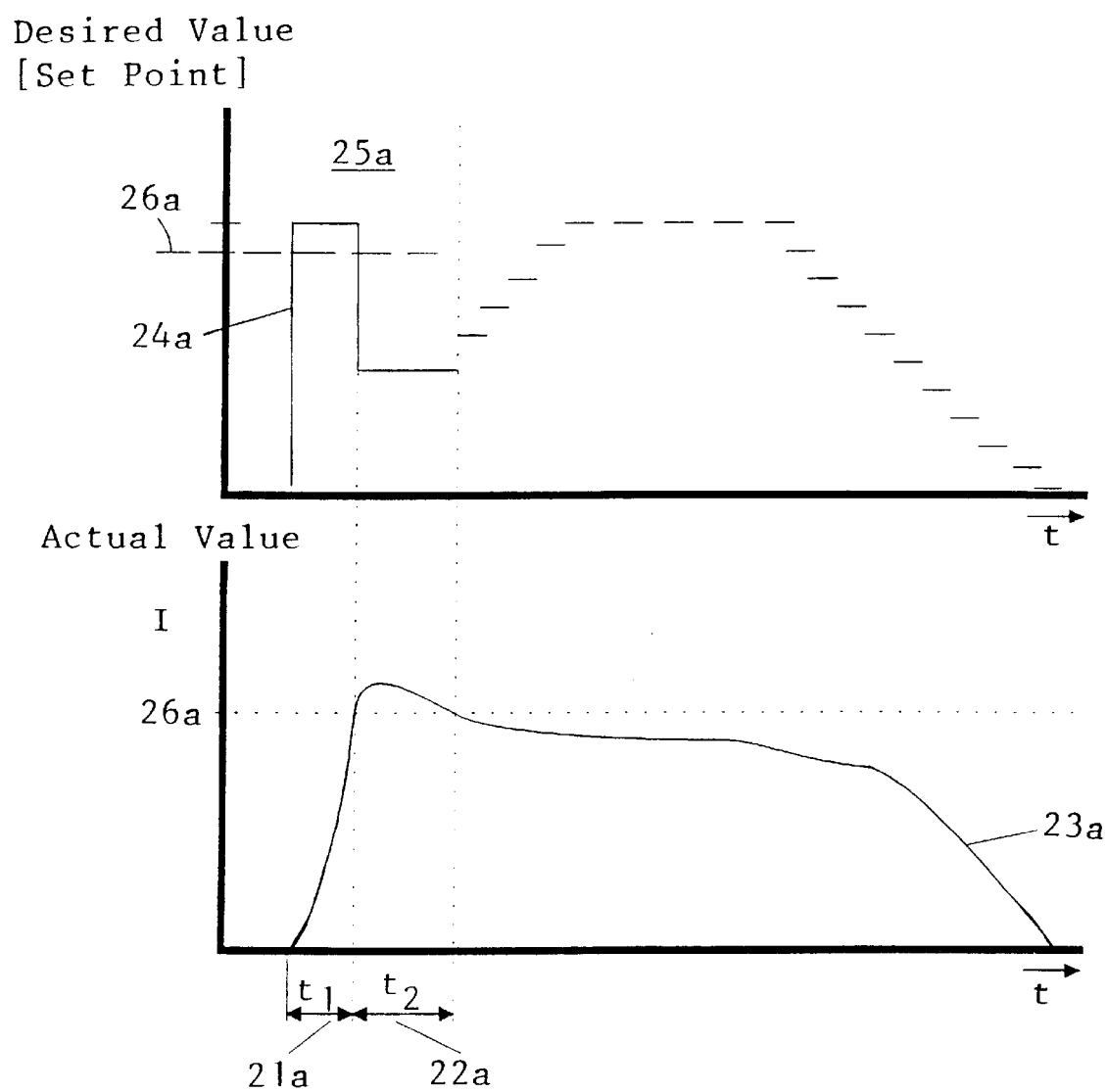
FIG. 2 shows the setpoint selection with the curve of the motor current.

FIG. 2, in the lower curve, shows the curve of the actual value of the motor current 23a over time, and in the upper curve shows the setpoint selection 24a of the motor current. The motor current is controlled on the basis of a pulse width modulation. In the test phase 25a, as illustrated in the flow chart in FIG. 1, the drive is tested at its maximum possible power, i.e. at the maximum attainable force between the primary and secondary closing surfaces. In the curve of the measured motor current 23a it is clear that the entire test must take place in the periods $t_1$ 21a and $t_2$ 22a. This curve also shows that the maximum motor current for the period 22a lies above the maximum allowable motor current 26a. The distance travelled by the door panels during this period is negligible.

As a result of the program sequences described above, it is clear that the invention has created a method which makes it possible to simply and economically regulate the motor current and keep it within specified ranges, and at the same time offers a maximum degree of safety.

In other words, referring back now to FIG. 2, at the beginning of a first time period $t_1$, the desired value (or "setpoint") $I_{Desired}$ of the motor current is set by the program run by the microprocessor of the control apparatus to a first value that is greater than the maximum allowed motor current during normal operation of the automatic door, referred to hereinafter as $I_{Max}$ (shown as 26a in FIG. 2). During this first time period $t_1$, the program then performs a check to determine that the actual current of the drive motor $I_{Actual}$ (shown as 23a in FIG. 2) does in fact reach a value within the first time period $t_1$ that exceeds the maximum allowed motor current during normal operation $I_{Max}$. If $I_{Actual}$ fails to exceed $I_{Max}$ by the expiration of the first time period $t_1$ during which $I_{Desired}$ has been set to a value that is significantly greater than $I_{Max}$, then a test negative result is reached by the program, and the operation of the automatic door is at least temporarily disabled. That is, the door is not permitted to operate until, for example, a repair person has performed an inspection.

At the expiration of the first time period $t_1$, assuming that the value of $I_{Actual}$ has in fact exceeded $I_{Max}$, then a second operational test is conducted in which $I_{Desired}$ is set by the microprocessor at the beginning of a second time period $t_2$ to a value which is significantly less than $I_{Max}$. During the second time period $t_2$, the program determines whether the actual value of the motor current $I_{Actual}$ has in fact fallen down to or below the maximum allowed motor current during normal operation $I_{Max}$. If, during the second time period $t_2$, $I_{Actual}$ has fallen to or below $I_{Max}$, then a positive test result is reported and the automatic door is permitted to continue in an operational state. If, however, at the expiration of the second time period $t_2$, $I_{Actual}$ remains substantially above $I_{Max}$, then once again a negative test result is reported and the automatic door is at least temporarily disabled as explained above.

Figure 3:
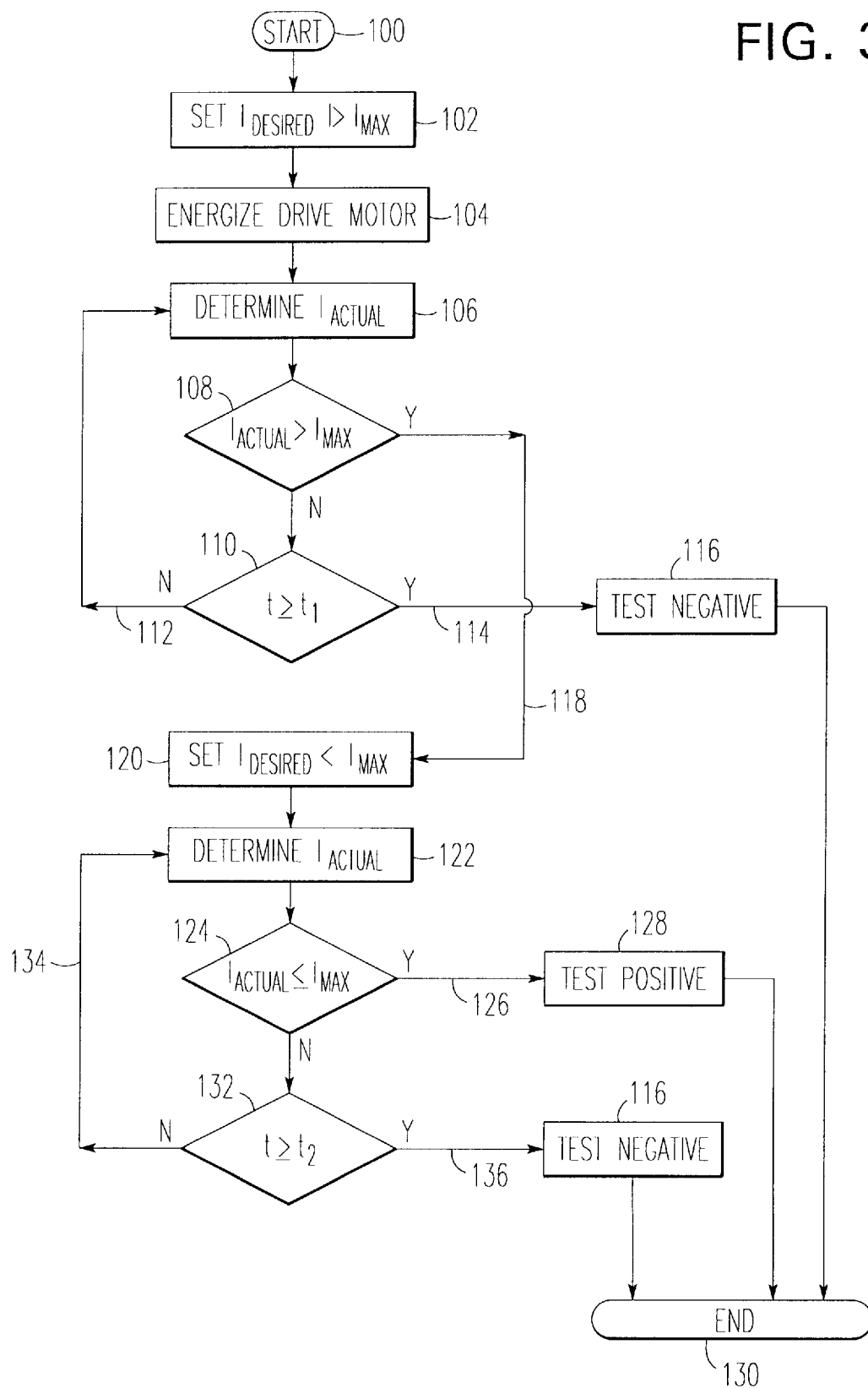
FIG. 3 is a flow chart of an alternative embodiment of a program to implement the test procedure of the present invention.

FIG. 3 is a flow chart illustrating another embodiment of a program which may be run by a microprocessor to carry out the procedure described immediately above. The program is initiated at the Start box 100 prior to any movement of the automatic door, that is, where the automatic door includes a displaceable door panel, prior to each movement of the door panel. The initiation of the program prior to each displacement of the door panel can be triggered by one of a number of events, for example, the tripping of a sensor (e.g., a light sensor, a pressure sensor, a capacitance sensor, etc.) to indicate that an individual is attempting to pass through the automatic door.

At 102, the desired current value $I_{Desired}$ is set by the microprocessor to a value that is greater than the maximum allowed motor current during normal operation $I_{Max}$, and the drive motor is energized at 104. The actual value of the motor current $I_{Actual}$ is determined (i.e. measured) at 106, and at 108 the program branches dependent upon whether $I_{Actual}$ is greater than $I_{Max}$. If $I_{Actual}$ does not exceed $I_{Max}$ at this particular time, a determination is made at 110 as to whether the first time period $t_1$ has expired. If the first time period $t_1$ has not expired, then the program loops back via branch 112 for another measurement and comparison of $I_{Actual}$. If, however, the first time period $t_1$ has expired, then the actual motor current has failed to exceed $I_{Max}$ during the first time period $t_1$, and the program proceeds through branch 114 and a test negative box 116 to the end of the program, as a result of which the automatic door is at least temporarily disabled.

If, however, on one of the passes through this branch of the program, $I_{Actual}$ is determined to exceed $I_{Max}$, then, via branch 118, the program proceeds to 120 where the desired motor current $I_{Desired}$ is set to a value less than $I_{Max}$. By a procedure similar to that described above, it is determined whether $I_{Actual}$ falls to a value equal or below $I_{Max}$ during the second time period $t_2$. That is, $I_{Actual}$ is determined at 122 and compared to $I_{Max}$ at 124. If $I_{Actual}$ is less than or equal to $I_{Max}$, then via branch 126, a positive test result is registered at 128 and the program proceeds to the end at 130. In such case, the drive system has passed both portions of the test, and the automatic door is permitted to proceed with the upcoming operation, i.e., displacement of the door panel.

On the other hand, if at 124, $I_{Actual}$ has not yet fallen to a level equal to or below $I_{Max}$, then a determination is made at 132 as to whether the second time period $t_2$ has expired. If it has not, then the program loops back via branch 134 for another determination and comparison of $I_{Actual}$. If $I_{Actual}$ fails to fall to a value that is less than or equal to $I_{Max}$ during the second time period $t_2$, then via branch 136, a test negative result is recorded at 116, the program proceeds to the end 130, and the automatic door is at least temporarily disabled.

In the particular preferred embodiments set forth herein, the invention has been described as utilizing primarily the drive motor current as the parameter that is tested and compared to ensure that the drive system is operating correctly. However, those of ordinary skill in the art will appreciate that other system parameters (or "characteristics") could be measured and used to determine whether the drive system is operating correctly, for example, the speed or torque of the drive system or door could be the system characteristic measured and compared to desired values. Additionally, the Counter EMF of the drive motor, the angle of the door panel, door velocity, pressure, resistance, inertia, and moment of inertia are characteristics which might be employed.

One interesting aspect of the invention is the introduction of a step function (e.g., a sharp discontinuous rise or drop in a system characteristic or parameter value) into the drive system. Such a step function is often referred to as a "Delta" or "Dirac" Function and can be utilized in a transform between the time and frequency domains. The step function can therefore be utilized to determine various system conditions, and the present invention is seen as having application in the introduction of a step function for the determination of such system conditions. Discussion of the Dirac or Delta Function is to be found in "Introduction to the Design of Servomechanisms", by John L. Bower and Peter M. Schultheiss, published by John Wiley & Sons (1958), for example, at pages 30–31, and in "Theory of Servomechanisms", by H. M. James, N. B. Nichols and R. S. Phillips, Radiation Laboratory Series, Vol. 25, p. 30, McGraw-Hill Book Co. (1947), both of these publications being hereby incorporated by reference herein.

In one embodiment of the present invention, the drive motor characteristic which is to be stored in a non-volatile memory element can preferably consist of the relationship between the duty cycle supplied to the drive motor (or, in another embodiment, the voltage supplied to the drive motor) and the corresponding drive motor current produced thereby. Such a characteristic, which is often presented in the form of a graph (e.g., a line graph) or a tabular result, can preferably be stored in the non-volatile memory element as a lookup table. Such lookup tables are well known in the art and are described, for example, in U.S. Pat. No. 5,313,611 issued to Franklin et al. on May 17, 1995 and entitled "Method and Apparatus for Maintaining a Lookup Table for Storing Function Values"; U.S. Pat. No. 5,216,439 issued to McCormack et al. on Jun. 1, 1993 and entitled "Scaling Systems for Data Recorders"; and U.S. Pat. No. 5,301,364 issued to Arens et al. on Apr. 5, 1994 and entitled "Method and Apparatus for Digital Automatic Gain Control in a Receiver", each of these U.S. patents being hereby expressly incorporated by reference herein.

As discussed above, in one embodiment of the present invention, the characteristic which is stored in the non-volatile memory element is the characteristic describing the relationship between the duty cycle or voltage of the drive motor and the resulting drive motor current, assuming correct operation of the automatic door, and the operating characteristic which is determined and compared to such stored characteristic is the actual drive motor current during the test. Current sensors for measuring currents that may be used in conjunction with this aspect of the invention are disclosed, for example, in U.S. Pat. No. 5,180,970 issued to Ross on Jan. 19, 1993 and entitled "Mechanically Adjustable Current Sensor and Method for Making Same"; U.S. Pat. No. 5,187,653 issued to Lorenz on Feb. 16, 1993 and entitled "Current Limiting Device"; and U.S. Pat. No. 5,179,340 issued to Rogers on Jan. 12, 1993 and entitled "Apparatus for Monitoring the State of Charge of a Battery", each of these U.S. patents being hereby expressly incorporated by reference herein.

Non-volatile memory elements that may be used in conjunction with the present invention are described in U.S. Pat. No. 5,190,887 issued to Tang et al. on Mar. 2, 1993 and entitled "Method of Making Electrically Erasable and Electrically Programmable Memory Cell with Extended Cycling Endurance"; U.S. Pat. No. 5,185,718 issued to Rinerson et al. on Feb. 9, 1993 and entitled "Memory Array Archetecture for Flash Memory"; and U.S. Pat. No. 5,194,929 issued to Ohshima et al. on Mar. 16, 1993 and entitled "Nonvolatile Semiconductor Memory and a Method of Manufacturing the Same", each of these U.S. patents being hereby expressly incorporated by reference herein.

The relationship of the Dirac delta function to the present invention is discussed above. Examples of use of the Dirac delta function are discussed in U.S. Pat. No. 5,184,079 issued to Barber on Feb. 2, 1993 and entitled "Method and Apparatus for Correcting Data Developed from a Well Tool Disposed at a Dip Angle in a Wellbore to Eliminate the Effects of the Dip Angle on the Data"; U.S. Pat. No. 5,255,212 issued to Kondoh on Oct. 19, 1993 and entitled "Method of Predicting a Physical Quantity of a Fluid or a Magnetofluid"; and U.S. Pat. No. 4,646,323 issued to Meinzer on Feb. 24, 1987 and entitled "Method and System for Digital Data Transmission", each of these U.S. patents being hereby expressly incorporated by reference herein.

Some examples of revolving automatic doors which employ a drive motor and which may be employed in conjunction with the present invention are disclosed in U.S. Pat. No. 5,187,895, issued to Huber on Feb. 23, 1993 and entitled "Revolving Door, Particularly for the Protection of the Access to a Room"; U.S. Pat. No. 5,201,142, issued to Rouwendaal on Apr. 13, 1993 and entitled "Revolving Door"; and U.S. Pat. No. 5,235,783 issued to Huber et al. on Aug. 17, 1993 and entitled "Revolving Door", each of these U.S. patents being hereby expressly incorporated by reference herein.

Some examples of sliding automatic doors which employ a drive motor and which may be employed in conjunction with the present invention are disclosed in U.S. Pat. No. 5,247,763 issued to Hein on Sep. 28, 1993 and entitled "Automatic Sliding Door"; U.S. Pat. No. D347068 issued to Rota on May 17, 1994 and entitled "Automatic Sliding Door"; and U.S. Pat. No. 5,325,628 issued to Yingling on Jul. 5, 1994 and entitled "Automatic Door Operator", each of these U.S. patents being hereby expressly incorporated by reference herein.

One feature of the invention resides broadly in the method for the closed-loop (or feedback or automatic) control of an automatic door which is propelled by a drive motor, whereby the sequence of movement of the door is activated by a continuous signal and/or at least one sensor signal, and there is a programmable electronic control unit with a microprocessor which contains a memory in which the characteristics of the drive motor used are stored, and whereby on the basis of a sequential program, the forces which occur on the closing edges of the door which move toward one another are measured, characterized by the fact that the drive system is verified by means of the stored motor torque characteristic at the beginning of each movement of the door panel or panels.

Another feature of the invention resides broadly in the method characterized by the fact that the verification is performed by a sequential program on the basis of the following criteria and steps: In the starting phase of the drive motor, the setpoint for the motor current is set to a value which is greater than the maximum allowable value of the stored characteristic. The drive motor is started. Measurement of the motor current. Verification of the maximum measured value of the motor current for a maximum time base $t_1$. If the maximum allowable motor current setpoint is exceeded, there is a reduction of the setpoint, after a specified interval of time, to an amount which is below the stored characteristic. If the maximum allowable value 26a of the motor current is exceeded, and if, after the reduction of the test specification (or setpoint), it does not reach the maximum allowable value 26a of the motor current within the maximum specified time $t_2$ 22a, the drive is automatically deactivated.

Yet another feature of the invention resides broadly in the method characterized by the fact that, in the event the maximum allowable setpoint of the motor torque characteristic is exceeded outside the time bases $t_1$ 21a and $t_2$ 22a, the drive motor is shut down immediately.

Still another feature of the invention resides broadly in the method characterized by the fact that to determine the motor characteristics, the motor current, the motor voltage and the corresponding motor speed are measured in a learning cycle and are stored in the control unit.

A further feature of the invention resides broadly in the method characterized by the fact that the motor characteristics are programmed.

Another feature of the invention resides broadly in the method characterized by the fact that the motor characteristics are stored in an $E^2$-PROM.

Yet another feature of the invention resides broadly in the method characterized by the fact that the drive motor is regulated by pulse width modulation.

This invention relates to a method for the closed-loop control of an automatic door which is propelled by a drive motor, in which the movement cycle, i.e. the beginning and the end, is activated by a continuous signal or at least one sensor signal. The door in question can be one of the following types, for example: sliding door, curved panel sliding door, folding door, three-panel folding door, revolving door, etc. and is equipped with a programmable electronic control unit which contains a microprocessor. Since people travel through the above-mentioned types of automatic doors, it is important to guarantee a maximum degree of safety for these doors, namely so that the doors pose no risk of trapping people between the edges of the door panels which move toward one another as they close. These risks can include, for example, situations in which the persons using the door can become jammed between the edges of the panels, or situations in which they can be injured by an excessive force generated by the door propulsion system between the edge of the door and the edge of the opposite surface. Therefore it is necessary to guarantee the safety of such closing operations, which can of course be accomplished by installing a complex and expensive system of sensors, or also by adopting measures which limit and monitor the force of the propulsion unit. This force limitation can be achieved, for example, if the power of the drive system is so weak that the drive motor is unable to exceed a specified force, but such a limitation results in an unsatisfactorily slow movement of the door panels.

European Patent Application 0 468 361 suggests a system which limits the closing force on the closing edge of a moving element. By means of a redundant system of measurement circuits, and in addition to the motor current which is measured by means of a measurement resistance, the setpoint of the maximum motor current is transmitted to redundant measurement systems, where it is processed. When a specified motor current is exceeded, a shutdown pulse is transmitted to the electronic control system of the drive. The system is reliable and/or fail-safe and inherently safe, on account of the redundant realization. Another European Patent Application 0 548 505 discloses a method and an apparatus for the determination of the dynamic mass of elevator doors. This method can be used at any closing speed to determine the corresponding kinetic energy of the door panel, thereby making it possible to define the kinetic energy of the door panel, and to analogously determine the kinetic energy on the closing edge. Conversely, on the basis of the kinetic energy determined, this system makes it possible to specify a maximum allowable closing speed which lies in the allowable range for such doors.

German Patent No. 42 06 272 A1 suggests a starting method and an apparatus for the operation of a controlled and/or an uncontrolled sliding or swinging door. In this method, the parameters are determined by the intelligent control system of the door itself once, at the beginning of operation when the door is turned on, and are then stored in a non-volatile memory.

German Laid Open Patent Application No. 39 21 158 discloses a drive apparatus for opening and closing an articulated door. This system includes a control device which limits the motor current on the basis of stored maximum setpoints for the motor current. These maximum setpoints thereby correspond to the maximum allowable door closing forces. Changes in parameters caused by factors of any type are not taken into consideration.

The object of the invention is to create a method and an apparatus by means of which a permanent limitation of the closing force between the primary and secondary closing edges of door panels of a door system can be achieved in an economical manner. In addition, the door must be self-monitoring, i.e. the method must be automatically verified in a specified rhythm. The invention teaches that this object can be achieved if a continuous comparison is made between the measured motor current and the motor characteristic stored in a programmable electronic control unit, on the basis of a sequential program. The sequential program guarantees the maximum degree of safety for the persons using the door.

The switched mode power supply which corresponds to such a drive system is generally capable of generating a greater force than is allowable on the primary closing edge. Powerful switched mode power supplies are therefore used, so that the movement of the door panels can be completed in a reasonable length of time, i.e. it must be possible for such a door to open in a reasonable length of time.

The invention teaches that the motor current is a parameter for the power of the connected drive motor. The determination of the motor current and thus the determination of the characteristic of the connected drive motor is a value which is representative of the torque this motor can generate, and is therefore a specific value. The motor current can either be determined by a programming process, or the system can measure the current itself by means of a measurement or a calculation of the internal resistance of the motor, since the current operating voltage is a known quantity. The known or determined values are stored, for example, in an $E^2$-prom (EEPROM). Within a specified length of time, the door tests itself automatically every time it moves, namely in the limit positions, i.e. when the door panel is in the closed or open position, to determine whether the allowable force on the primary or secondary edges is being exceeded. Such a test sequence can proceed as follows:

The setpoint for the motor current is set to a value which is greater than the maximum allowable stored value.

The motor is started.

Is the current of the motor at the value of the maximum allowable current?

Has the maximum time base $t_1$ elapsed?

The measured value is set to a value which is less than the maximum allowable setpoint.

Is the measured value at a value which is below the maximum allowable setpoint?

Has the maximum time $t_2$ elapsed?

Test positive.

Test negative.

By means of the first setpoint step-change in the opening direction when the motor is turned on, current flows through the drive motor and the motor current reaches a limit which is greater than the maximum allowable actual value. This limit is reached in the first few centimeters of the opening phase. The setpoint is then reduced, which results in a reduction of the motor current to a point which is less than the limit value. This entire process must be completed within a specified period of time. If an error occurs, the error is reported, and the door is immediately and automatically switched into a safe status. The invention is explained in greater detail below with reference to one possible embodiment which is illustrated schematically in the accompanying figures.

On the basis of a sequential program which is stored in the memory which is part of the microprocessor, the system guarantees that the motor current may not exceed a maximum specified value. The magnitude of the motor current is a measurement which is representative of the force which can occur between the primary and secondary closing edges of an automatic door. For example, a sequential program can be designed so that in the startup phase, current is applied to the drive motor by means of a control command. As noted above, the connected power supply which is responsible for supplying power to the drive motor is generally sized with some reserve capacity or oversized so that the door panel, which is quite heavy, can be placed in motion quickly. Thus the motor can be optimally accelerated as a function of its torque characteristic without exceeding the allowable force. But at the same time, the motor current is measured continuously, and on the basis of the sequential program, the motor current is reduced at the point where the excess current occurs outside the specified time base. Because the setpoint is reduced, the measured value of the motor current is also simultaneously reduced, and thus there is a reduction in the force which occurs. If the motor current were to increase above the maximum allowable value while the door was in operation, the drive would be shut down by means of a second disconnect system. This feature guarantees that the door panels pose no danger to the persons using the door.

Frequently, one and the same open-loop control unit, and thus also the closed-loop control unit, is used for different types of doors, which means that the motor which is connected will be different, as a function of the weights of the door panels in question or the requirements of the specific site. For this reason, the motor characteristics must be stored in a non-volatile memory, which can be an $E^2$-PROM, for example. But it is also possible that the door system can use its intelligent capabilities to measure the motor characteristics by means of a learning cycle, and the values determined during this learning cycle are also stored in a non-volatile memory, where they can be called up and processed by the microprocessor which is part of the system. In addition to the measurement of the motor characteristics and thus of the motor current, the motor voltage is also measured. It thereby becomes possible to have all the characteristic data of the drive motor stored, on the basis of the characteristic of the motor.

The invention also teaches a method which makes it possible, on the basis of a specified, selectable time interval, to guarantee that the drive is tested to verify that the maximum forces on the primary and secondary closing surfaces are within parameters. Referring again to the flow diagram of FIG. 1, a starting command 20a is given which activates the setpoint selection 1a. The setpoint selection 1a specifies the maximum allowable motor current, which lies above the allowable current for normal operation. This maximum allowable motor current is in turn stored in a non-volatile memory, after it has been measured in a learning cycle or after it has been programmed. If the setpoint of the motor current is below the maximum allowable value, this value is transmitted by means of the selection 10a to a subroutine which performs the setpoint comparison 5a. The setpoint of the motor current is reprocessed in an actual value comparison element 6a. If the actual value is greater than the allowable value, by means of the message "lower actual value" 13a, this fact is forwarded to the "test negative" evaluation element 9a. Because the test has produced a negative result, a command 18a goes to the end of the test program 19a. If a time has been specified, this test can then be repeated either immediately or at a later time, depending on the customer's requirements. But if the current of the motor is at a value which is less than the maximum allowable value, this current is transmitted by the sequential program to the time base 7a $t_2$. If the total amount of time required for the sequence is within the specified time $t_2$, this fact is reported to the test evaluation element 8a by means of the test report element 15a. The test evaluation element 8a indicates that the test has been conducted with a positive result, and thus the drive is operating within the requirements. This fact is then reported via the command element 17a to the end of the test 19a. It is necessary to repeat the test at a later time. But if the motor current is on a level which is higher than allowed, this fact is reported by means of the time base 7a and the feedback loop 14a to the actual value element 6a of the motor current. But if the motor current is reduced within the period $t_2$ of the time base 7a, then as described above, a positive test result is reported. If the drive is not capable of keeping the motor current within the specified limits in the specified length of time $t_2$, then this fact is reported to the program by means of the actual value element 6a and the reporting element 13a as a negative test result 9a. There is another branch of the program, in which the detection of the motor current 3a at a level which is below the allowable value is reported by means of the selection element 11a to the time base 4a $t_1$. If the time has not yet elapsed, this fact is reported by means of the test reporting element 16a to the test evaluation element 8a as a positive result of the test. But if the test is negative within the time base 4a, this fact is reported via the feedback loop 12a to the motor current measurement element 3a, so that a decision can be made by the program between a positive or a negative test within the specified time. Referring again to FIG. 2, the lower curve, shows the curve of the actual value of the motor current 23a over time, and the upper curve shows the setpoint selection 24a of the motor current. The motor current is controlled on the basis of a pulse width modulation. In the test phase 25a, as illustrated in the flow chart in FIG. 1, the drive is tested at is maximum possible power, i.e. at the maximum attainable force between the primary and secondary closing surfaces. In the curve of the measured motor current 23a it is clear that the entire test must take place in the periods $t_1$ 21a and $t_2$ 22a. This curve also shows that the maximum motor current for the period 22a lies above the maximum allowable motor current 26a. The distance travelled by the door panels during this period is negligible. As a result of the program sequences described above, it is clear that the invention has created a method which makes it possible to simply and economically regulate the motor current and keep it within specified ranges.

Figure 4:
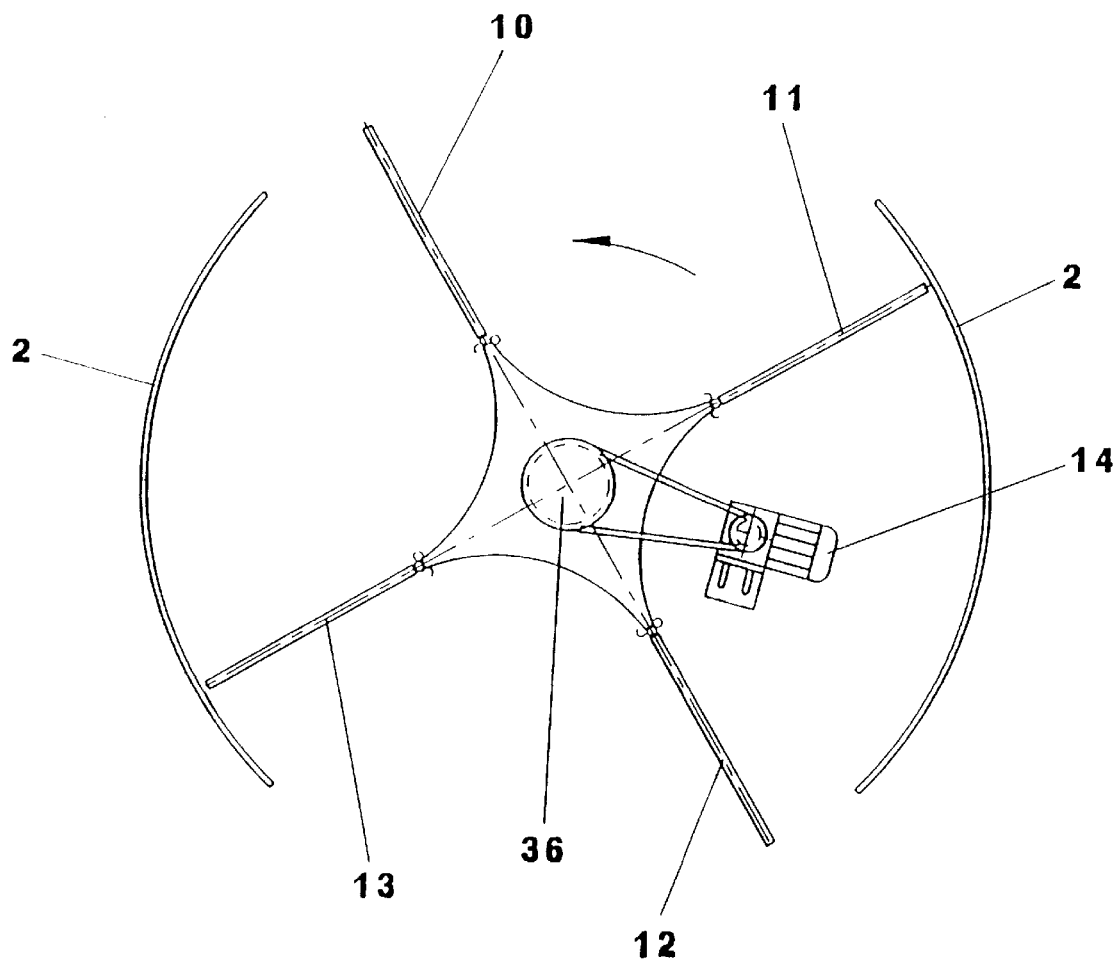
FIG. 4 shows a revolving door in an overhead view.
Figure 10:
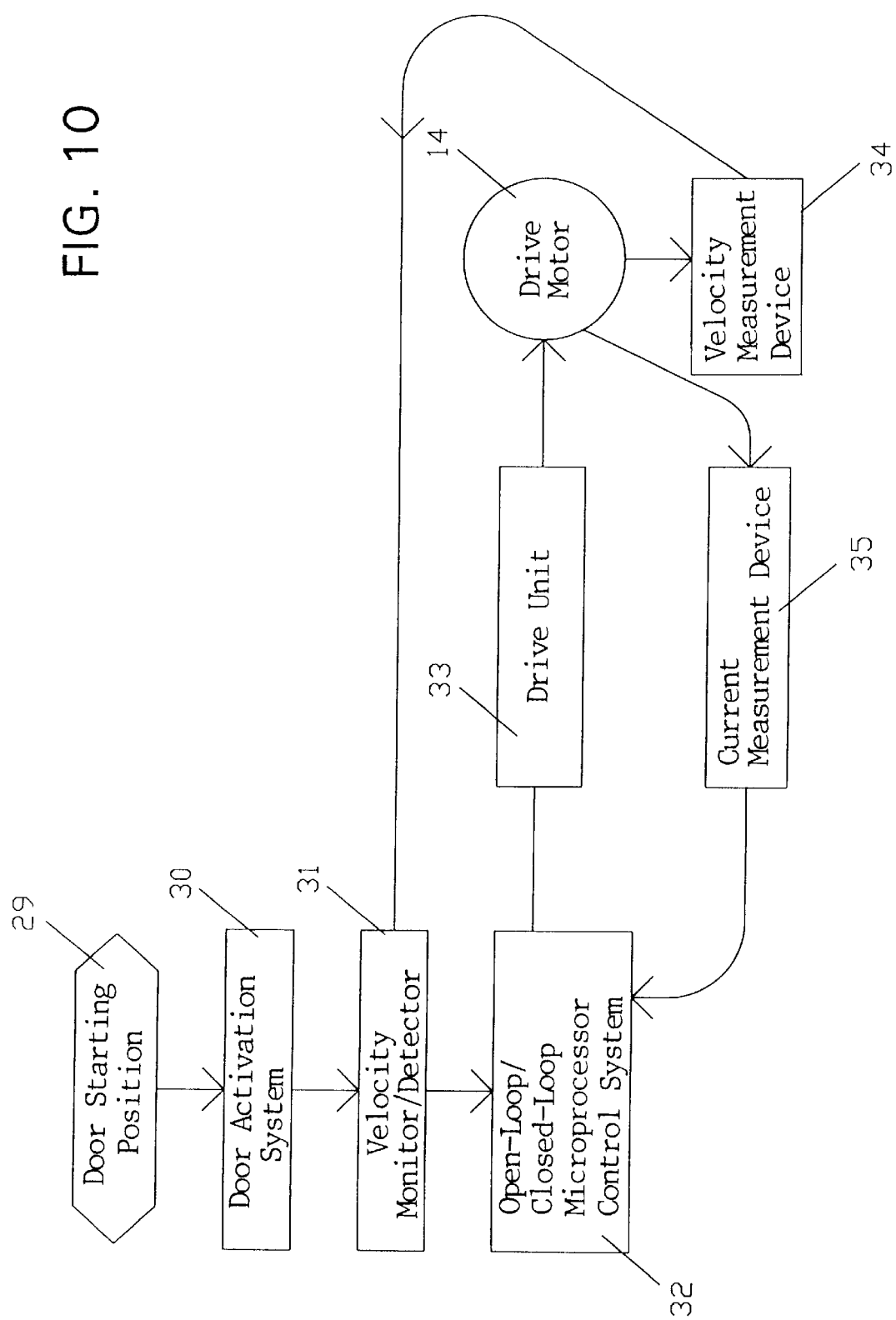
FIG. 10 is a block diagram of the drive motor control unit.

FIG. 4 is a schematic illustration of a revolving door, in an overhead view that may be utilized in accordance with the embodiments of the present invention. Between two drum walls 2, there are panels 10, 11, 12 and 13 of the revolving door which are fastened rotationally at a center point. The panels 10, 11, 12 and 13 are connected to a drive motor 14 by means of a drive wheel 36. To set the panels 10, 11, 12 or 13 in motion, a pressure must be exerted by at least one person on at least one of these panels. Since the pressure or the force is proportional to the velocity, for purposes of simplicity, in the following embodiment, reference is made primarily to the velocity. The increasing peripheral velocity of the panels 10, 11, 12 and 13 of the revolving doors follows a quasi-ascending ramp during the startup phase 8, as shown most particularly in FIGS. 5 and 6. The actual velocity 15, which increases from zero to its final value and is initiated by manual contact, continues to increase as long as the person continues to exert a higher pressure on one of the panels 10, 11, 12 or 13. As the panels 10, 11, 12 and 13 begin to revolve, the velocity is determined by a peripheral velocity measurement device 34 (shown in FIG. 10), e.g., by means of an incremental sensor or a tachometer generator. The actual velocity is thereby measured cyclically, whereby the cycle time is adjustable. At the same time, an open-loop/closed-loop microprocessor control system 32 is informed by means of a velocity monitor/detector 31 of a door activation system 30, that the door panels 10, 11, 12 and 13 are no longer stationary. The velocity measurement device 34 then reports any change in the velocity to the velocity monitor/detector 31 and thus to the open-loop/closed-loop control system 32. This signal is an indicator that the drive motor 14 must be activated by means of a drive unit 33 of the open-loop/closed-loop control system 32, because the system does not require the person operating the door to reach the actual speed alone and thus to apply all the force required. A power assist (37 in FIG. 5 and 16 in FIG. 6) is thereby preferably realized by means of a pulse width modulation, which follows the curve of the actual speed 15 of the force exerted manually in specified steps. But in any case, continuous contact with the panel of the revolving door must be maintained. If the velocity of the door panel increases, the level of the power assist 16 will also increase up to a maximum value.

When a revolving door of the type described above is initially actuated manually, it runs through a learning cycle, during which it measures all the necessary parameters of the door and stores them in a non-volatile memory. One of these parameters is also the current absorbed by the drive motor 14. The current measurement device 35 thus continuously reports the instantaneous current absorbed by the drive motor 14 to the open-loop/closed-loop control system 32.

When no increase in the current speed 15 of manual operation is measured, the open-loop/closed-loop microprocessor control system 32 begins the phase of uniform motion. In this range, too, the power assist function continues to be provided, thereby boosting the speed at a level below the actual speed of the door panels 10, 11, 12, 13.

Figure 6:
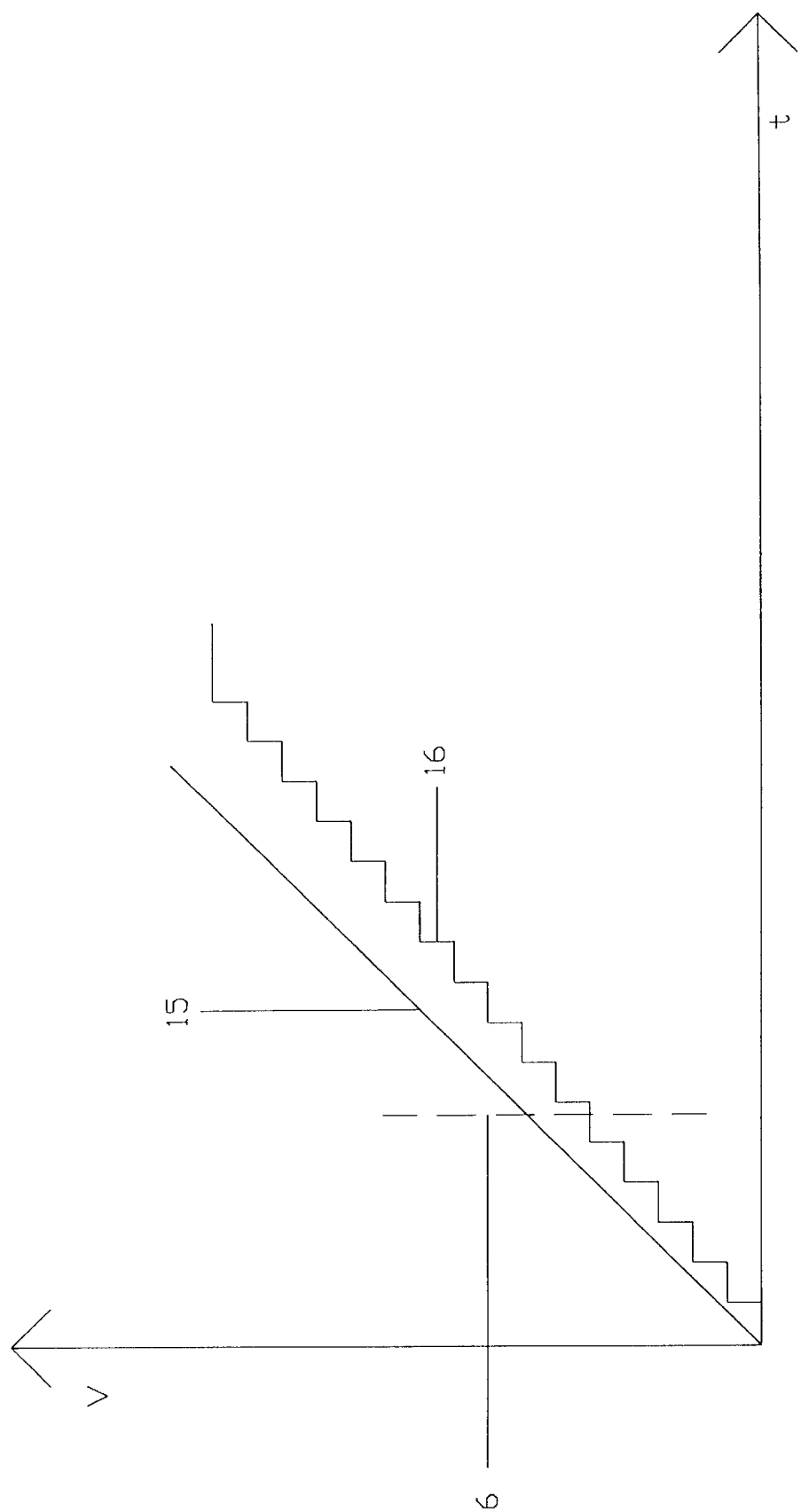
FIG. 6 is an ascending ramp (acceleration).
Figure 7:
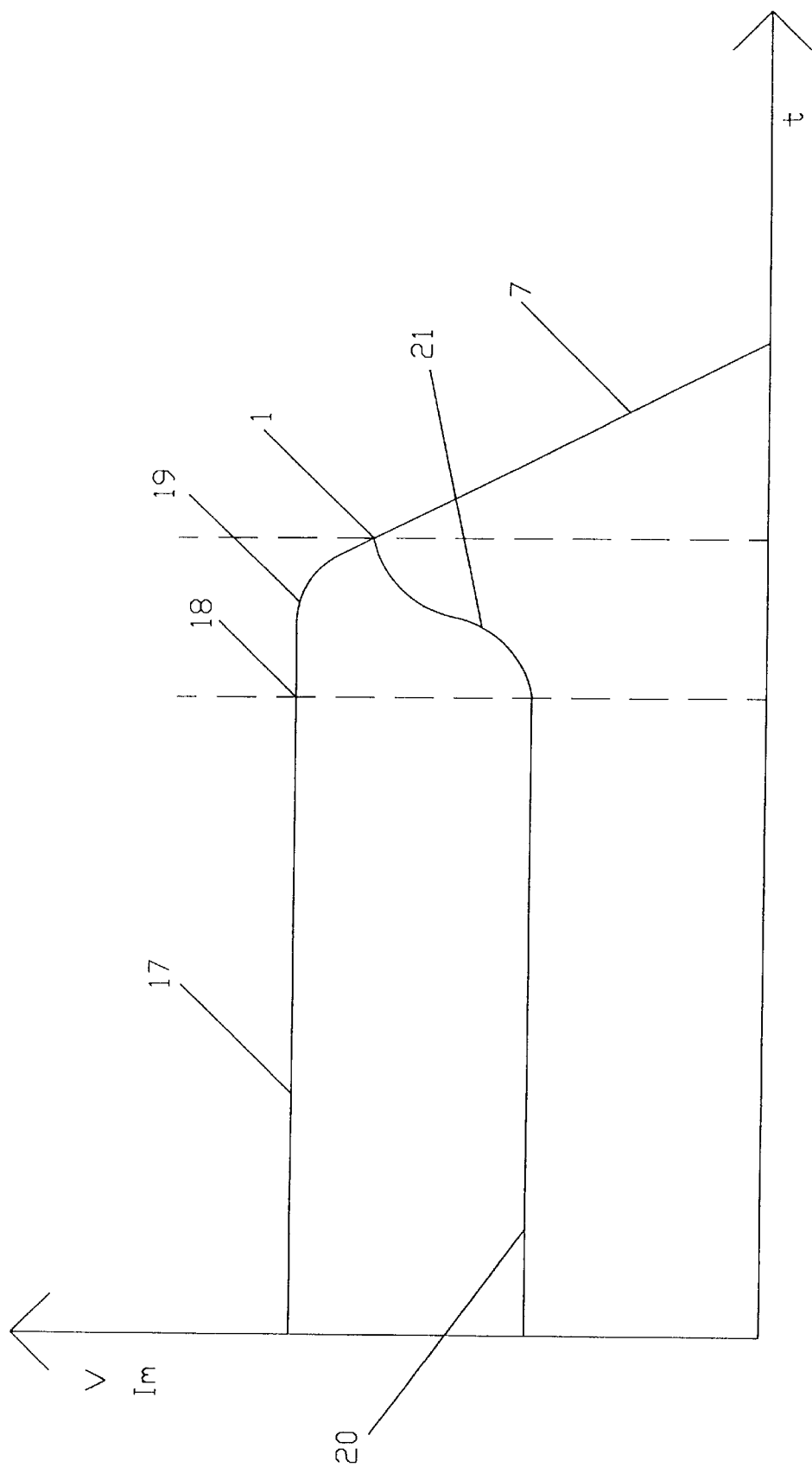
FIG. 7 shows continuous motion and the detection of the disconnect point.

This uniform motion is illustrated in FIG. 7, in which, in addition to the velocity over time, the motor current (Im) is also plotted over time. If the manual boost 17 is a uniform motion, then the magnitude of the motor current 20 is also uniform. If the motion is uniform, the velocity is continuously measured by means of the velocity detection device 34, and the current absorbed by the drive motor 14 is measured by means of the current measurement device 35. If the velocity of the door panels increases, an ascending ramp like the one illustrated in FIG. 6 is established. But there are also restrictions which are integrated in this mode of operation, which are specified by the determination of the parameters learned by the revolving door during its learning cycle. For example, if the current absorbed by the motor remains below a specified upper disconnect limit, the open-loop/closed-loop microprocessor control system 32 performs only a monitoring of this condition, because the remaining portion of the required current speed must be applied by the person using the door. But as soon as manual assistance is no longer being provided, i.e., if the manual assistance 18 were discontinued (as at 18 in FIG. 7), the system would detect a velocity decrease 19, which would in turn result in an increase of the current 21 absorbed by the motor. This increase of the absorbed current 21 is tolerated by the open-loop/closed-loop microprocessor control system 32 until there is an intersection 1 with the parameters learned by the system, which intersection 1 is specified by the program. If this point is reached, the disconnect limit of the motor current 21 is also reached, and after a specified disconnect recognition time, the motor is brought to a stop by means of a descending coasting ramp 7, shown in FIG. 8. This coasting ramp 7 imitates the normal coasting of a manual door, and like the startup phase 8, is preferably realized by means of pulse width modulation, e.g., by a series of current pulses of decreasing time duration. As a result of the detection of the fact the door is supposed to coast, the descending coasting ramp 7 is carried out, because even in the event of a direct disconnection of the drive motor 14, the motor would continue to turn as the door coasted to a stop, which would in turn be detected by the velocity detection system 34 as a repeated passage of persons through the door, although that would not be the case. On the basis of this method of operation, the sequence of motions is realized just as in a manual door. If the door is no longer contacted by a person, after the decrease of the total energy of rotation, the door comes to a stop. The door can only be reactivated from the starting position 29 by setting the panels 10, 11, 12 and 13 in motion, which is in turn detected by the door activation system 30 and reported correspondingly to the open-loop/closed-loop microprocessor control system 32. This illustrates that the servo assist is realized only in response to the exertion of a manual force, i.e., contact with one of the door panels 10, 11, 12, 13. The servo assist is thereby permanently monitored by the control software. As a result of this method of operation, it becomes clear that the sequence of motion in the servo mode of such a revolving door corresponds to the manual operation of the door, and thus does not require any system of safety sensors for the person operating the door.

On account of the method of operation described above, it is apparent that a different pressure or even tension on one of the door panels will be detected by the velocity measurement device 34 and also by the current measurement device 35, and this interaction will be reflected either in a startup phase 8 or in a coasting ramp 7. It is thereby apparent that a change in velocity, but only an increase, is an indicator for the open-loop/closed-loop microprocessor control system 32 to once again increase the peripheral velocity. On the other hand, the current measurement is required to more precisely detect the disconnect point.

Figure 5:
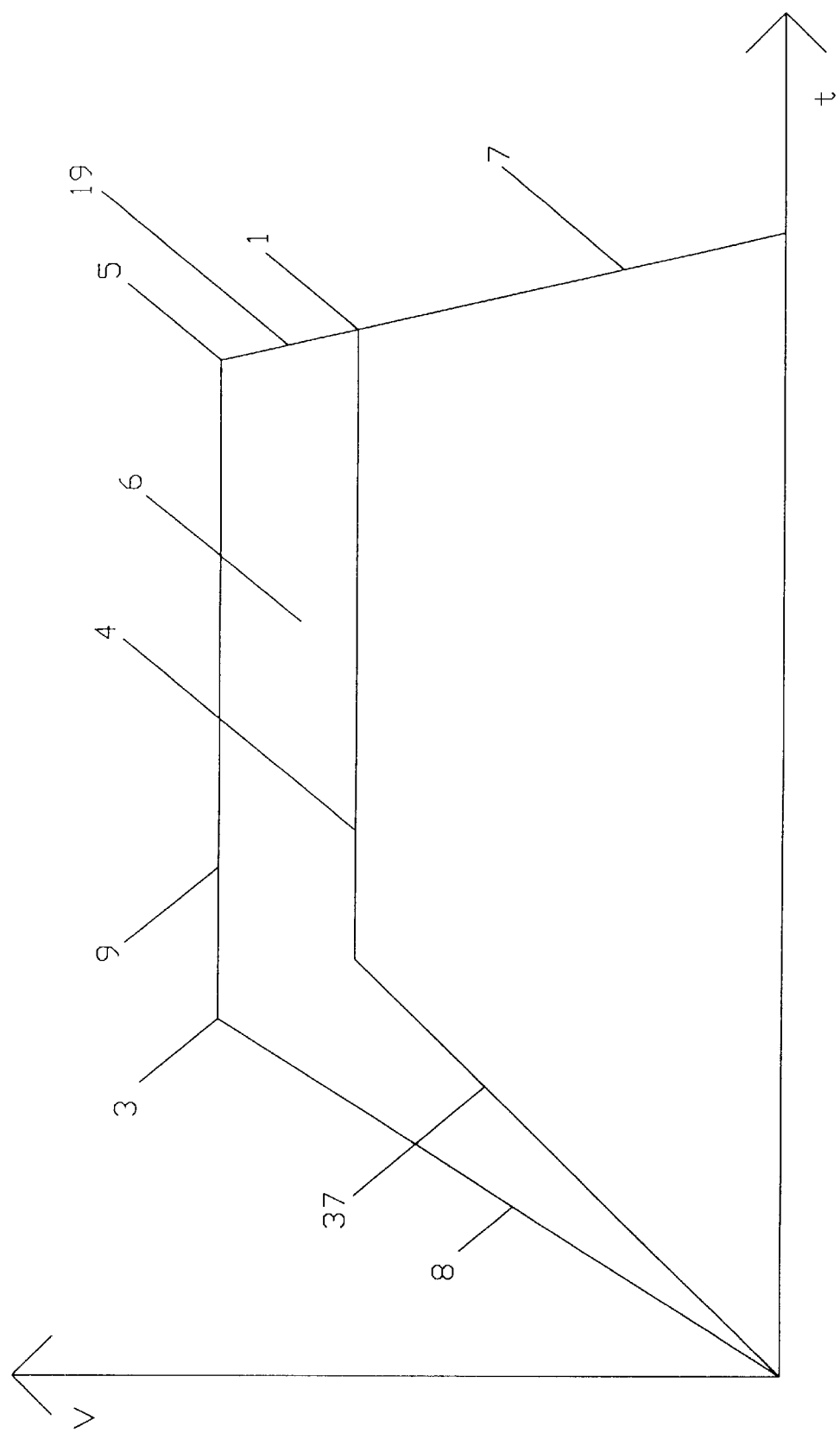
FIG. 5 is a diagram of velocity/time.

In the diagram in FIG. 5, which shows the velocity plotted over time, the start-up phase 8 is presented in the front area. With a certain lag, this start-up phase 8 follows the power assist 37 provided by the motor up to the point where the curve is deflected into the uniform velocity 3. At the total velocity 9 it is apparent that the booster velocity 4 is always less than the total speed, and thus the velocity difference 6, $\Delta v$, is the component of the velocity which must be supplied by the person using the revolving door. If the uniform velocity ceases at point 5, i.e., if contact with one of the panels 10, 11, 12 or 13 of the revolving door is interrupted, there is a decrease 19 in the velocity, and at the instant the open-loop/closed-loop microprocessor control system 32 recognizes that this is a coasting ramp 7, the ramp is run according to the program, because the current 20 absorbed by the motor increases on account of the absence of contact with the door panels, and thus the drive motor 14 must keep the door panels 10, 11, 12 and 13 in rotation all by itself. But since the drive motor 14 need not supply the total peripheral velocity, on account of the control program, the coasting phase enters the coasting ramp 7.

Figure 8:
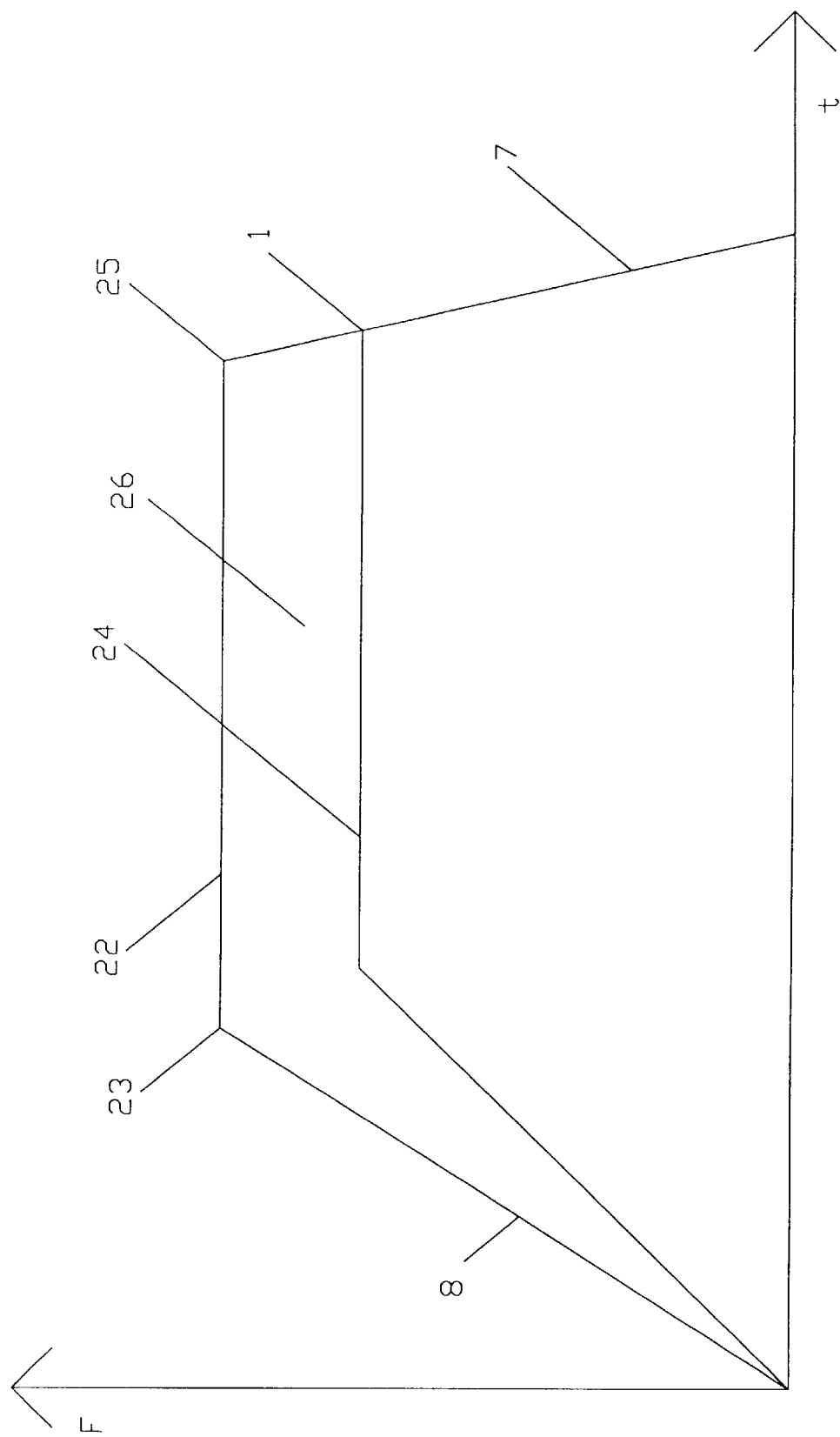
FIG. 8 is a diagram of force/time.

In addition to the criterion of velocity as a control parameter, however, the force can also be measured, as illustrated in the diagram in FIG. 8. FIG. 8 illustrates the force to be applied plotted over time. During the startup phase 8, the force increases over time at a constant rate, until a uniform force 23 is exerted by one of the persons on the panel of the revolving door. The total force 22 is thereby composed of the booster force 24 supplied by the drive motor 14 and the differential force 26 which must be supplied by the person. As with the consideration of the velocity, in this case, too, on account of the proportionality between force and velocity, when the force 25 ceases, there is a reduction of this velocity, and thus under the control of the sequential program, the revolving door with its revolving panels 10, 11, 12 and 13 makes the transition into the coasting ramp 7. For this application, it is also possible to take a measurement of the force directly on the door panel, e.g., using strain gauges.

Figure 9:
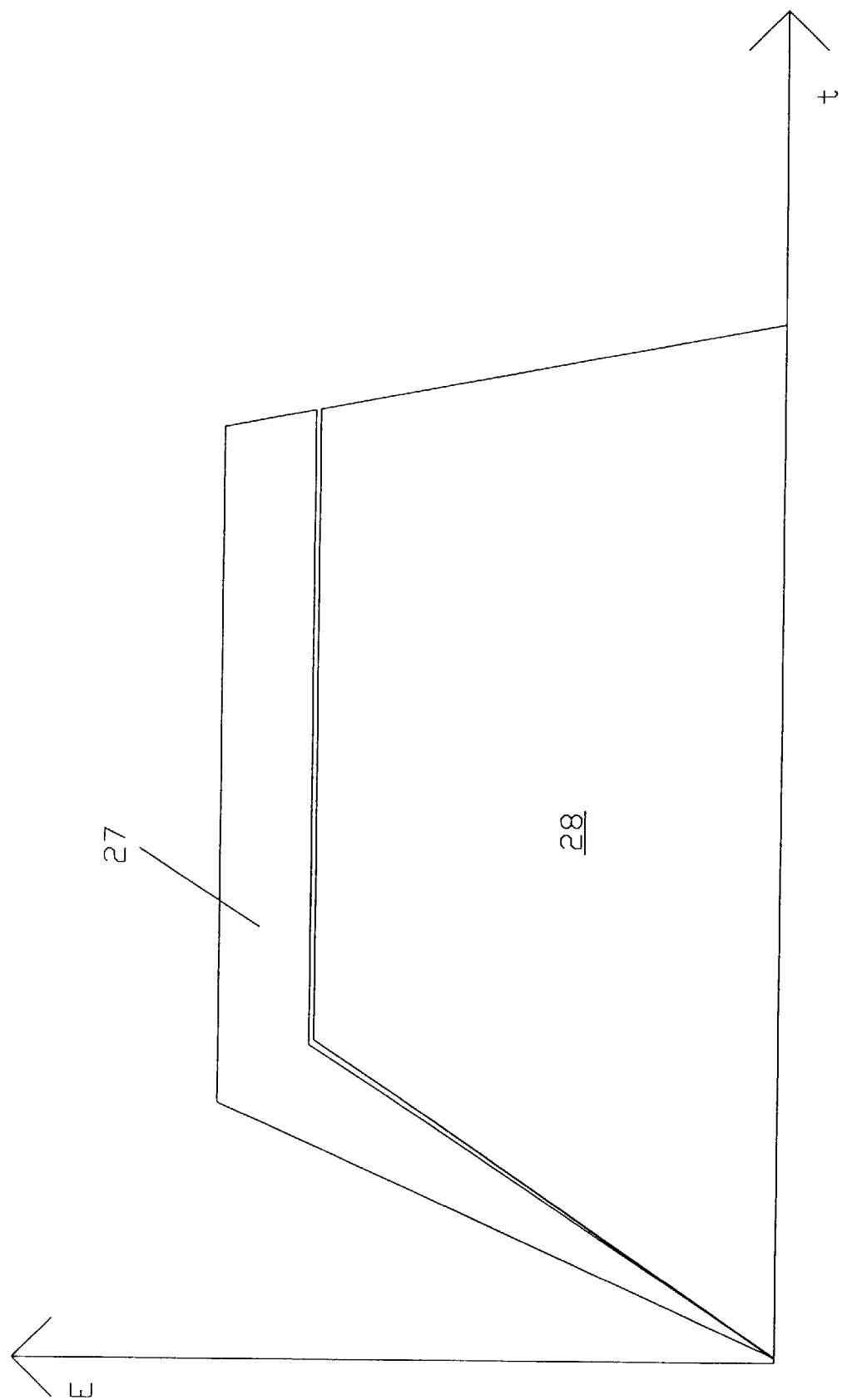
FIG. 9 is a diagram of energy/time.

On account of the computer program used, the open-loop/closed-loop microprocessor control system 32 is also able to calculate the energy contents. This situation is illustrated in FIG. 9, where the kinetic energy is plotted with respect to time. The maximum kinetic energy which must be supplied for the operation of the revolving door is supplied by the motor energy 28, whereby the manual energy 27 required is significantly less.

While the above embodiment has been described as one in which either a user applied force or a user imported velocity is sensed by the control circuit, in another embodiment, various other methods can be employed to sense the presence and/or movement, such as, for example, proximity detectors, a change in capacitance, etc.

Figure 11:
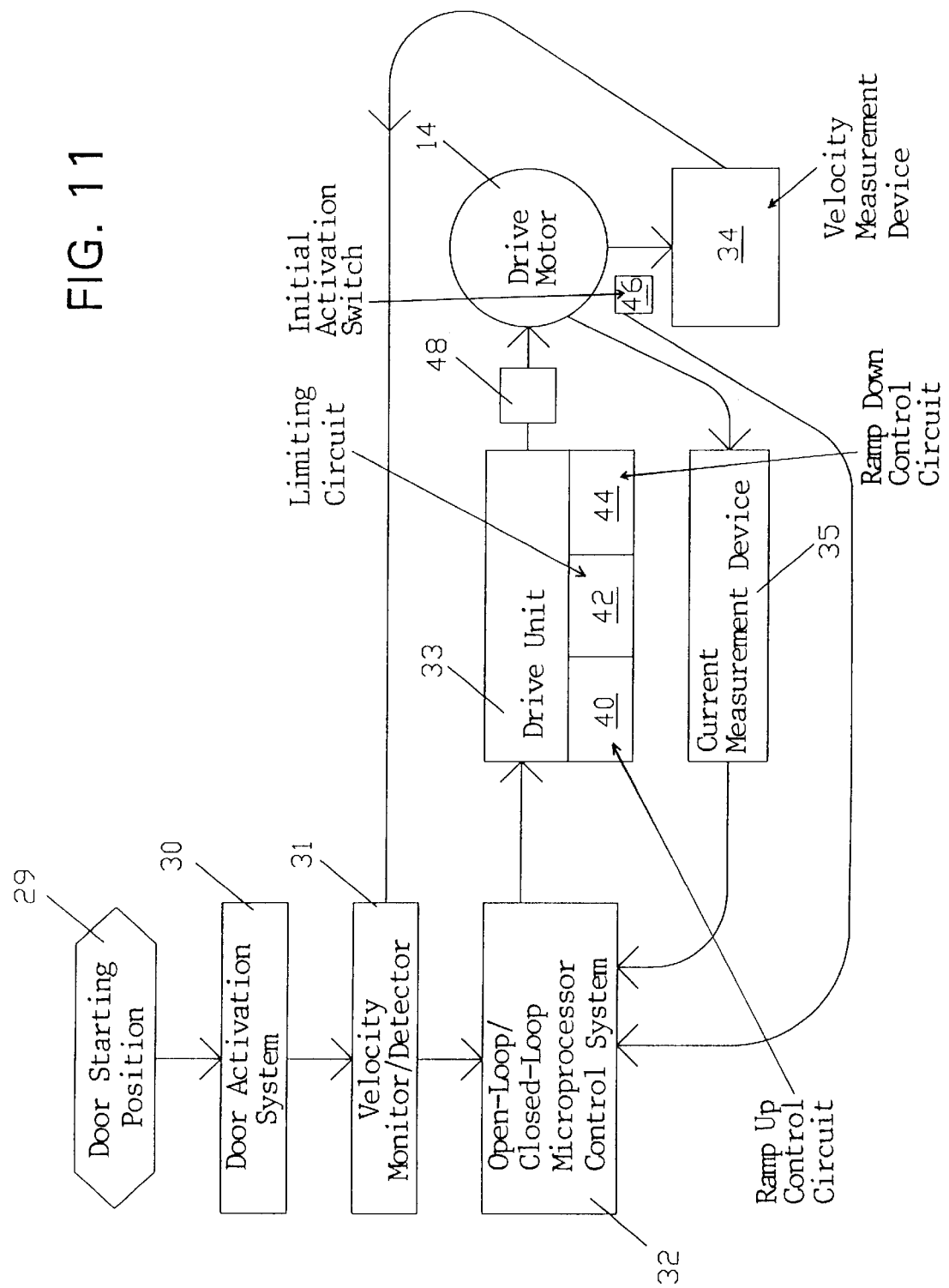
FIG. 11 is also a block diagram, however illustrating the drive motor control in more detail.

FIG. 11 shows additional control elements which may be included in one embodiment of the invention. There, the drive unit 33, which controls the drive motor 14 may include control circuitry (e.g., either hard wired or in the form of portions of the program executed by the open-loop/closed-loop microprocessor control system 32) as follows:

a ramp up control circuit 40 which, upon sensing either user imported velocity of the door panels 10, 11, 12, 13, causes the drive motor 14 to be operated so as to increase the drive torque supplied during an initial limited period of time of increasing rotational velocity;

a limiting circuit 42 which limits the torque supplied by the drive motor 14 to the revolving door so that it does not exceed a specified parameter of movement (e.g., rotational velocity, kinetic energy, etc.); and a ramp down control circuit 44 which serves to operate the drive motor 14 so as to decrease the torque supplied to the revolving door during a limited terminal period of time during which the rotational velocity of the revolving door is decreased.

In one embodiment, the ramp down control circuit 44 may include circuitry for causing the rotational velocity of the revolving door to decrease in a manner which closely resembles the natural coasting to a stop of a non-powered revolving door. This may be implemented, for example, in the form of a so-called "look up table" in memory (e.g., ROM), where the microprocessor control system 32 uses a measured parameter (e.g., velocity) to access data stored in the memory to operate the drive unit 33 such that the revolving door appears to coast to a natural stop.

Also shown in FIG. 11 is an initial activation switch 46, the state of which, in one embodiment, is determined by the microprocessor control system 32, which operates to supply torque to the revolving door only if the initial activation switch 46 has been actuated, regardless of whether any user applied force or user imported velocity has been detected.

Figure 12:
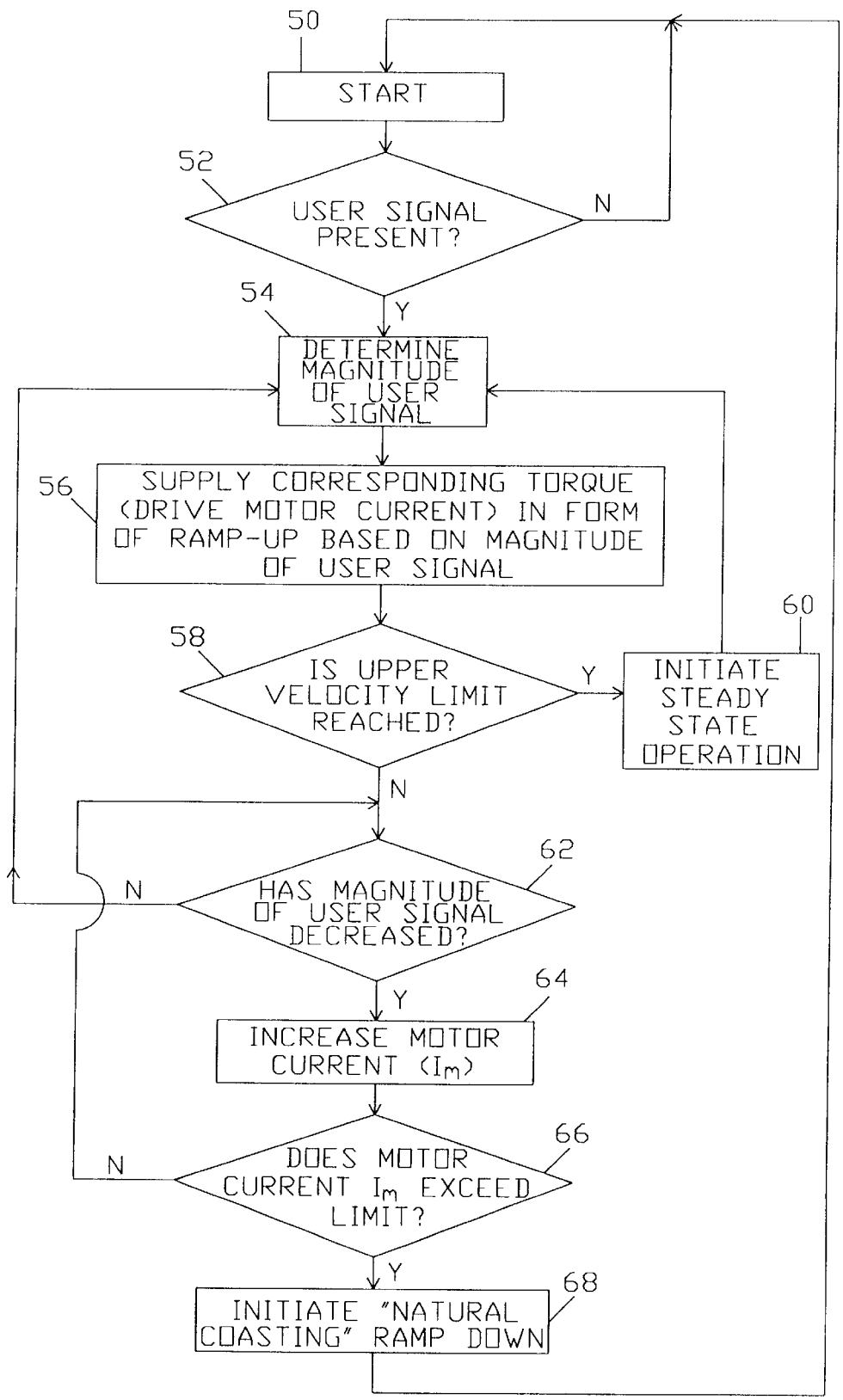
FIG. 12 is a flow chart illustrating the operation of an open loop/closed loop microprocessor control system.

FIG. 12 is a flow chart illustrating the logic employed by the microprocessor control unit 32 in controlling the rotational torque supplied by the drive motor 14 to the revolving door in one possible embodiment of the invention. Upon start up 50 of the control program, the microprocessor control unit 32 determines whether a User Signal, that is, for example, either a user applied force or a user imparted velocity. Upon detection 52 of a User Signal, the microprocessor control unit 32 determines the strength or magnitude of the User Signal (at 54) and, at 56, supplies a rotational torque, in the form of drive motor current (Im) which corresponds to the magnitude of the User Signal, for a higher User Signal, more drive current (Im) being supplied. Additionally, during this stage of operation, the drive current (Im) is supplied in the form of a ramp-up (i.e., substantially steadily increasing velocity profile that closely parallels but is always less than the total rotational velocity of the revolving. The appropriate velocity profile can be easily determined, for example, by accessing an emperically determined look-up table, etc.

The microprocessor control unit 32 determines (at 58) whether the rotational velocity of the revolving door has reached a specified upper limit: if so, a steady state operation is initiated at 60; and if not, the microprocessor control unit 32 determines whether the magnitude of the User Signal has decreased of the User Signal has decreased at 62. From both the steady state operation 60X 60 and the No output of the decision 60X 62, the control program returns to determining the magnitude of the User Signal (at 54).

Upon a Yes determination from the decision 60X 62, the control program at least temporarily increases the drive motor current (Im) by a rather small amount (at 64), in the event the User needs additional assistance. The microprocessor 32 then determines whether the motor current (Im) exceeds a specified limit (at 66). If not, the control program jumps back to the input of decision box 62. If the drive motor current (Im), the control program initiates (at 68) a ramp down velocity profile, which preferably substantially corresponds to the decreasing velocity profile of an ordinary manual revolving door. During the ramp down period, the microprocessor also jumps back to decision box 52, so as to detect any new User Signal.

On the basis of the embodiments and the various measurement types and methods described above it is apparent that a revolving door can be operated according to the method of the present invention without any system of safety sensors for the persons using the door. The peripheral velocity of the door panels 10, 11, 12 and 13 is determined solely and exclusively by the person using the door, i.e., if there are several persons in the individual spaces between the panels, the person who exerts the maximum force on the door panel in front of him determines the maximum speed of revolution of the door panels. But it is also possible that another person, for whom the peripheral velocity of the door panel is then too great, may exert a braking action, e.g., by pulling back on the door panel in front of him. Consequently, the overall peripheral speed of the door panels will be reduced.

On account of the requirement for constant contact on the door to be maintained by the individual persons using the door, this method of operation can be considered equivalent to a manual revolving door. Consequently, the safety sensor system which would otherwise be necessary can be eliminated.

With regard to the sensor system installed on a revolving door, a distinction must be made between a sensor system for the normal operation of a door and the safety sensor system. The operating sensor system can, for example, consist of a tachometer generator or an incremental sensor which measures the total velocity of the door panels. The safety sensor system is necessary for the safety of the persons who use a motor-driven revolving door. This type of safety system can consist of photoelectric barriers, infrared sensors, contact mats, sensor strips, radar devices, etc. All these safety sensors increase the cost of the revolving door enormously. With the operating method of the present invention, it is therefore possible to eliminate all these sensors, while simultaneously guaranteeing safe operation of such a door, thereby presenting the operator with an economical alternative to a revolving door operated on the basis of known methods.

The activation of the door from a stop need not be realized only by pressing on the panels, but a person can also actuate a switch, button or sensor to set the door in motion. But in that case, it is generally essential to make contact with and apply pressure to one of the door panels 10, 11, 12 or 13, so that the force and thus the total velocity of the panels of the revolving door can be measured, so that the drive can provide power assistance.

Figure 13:
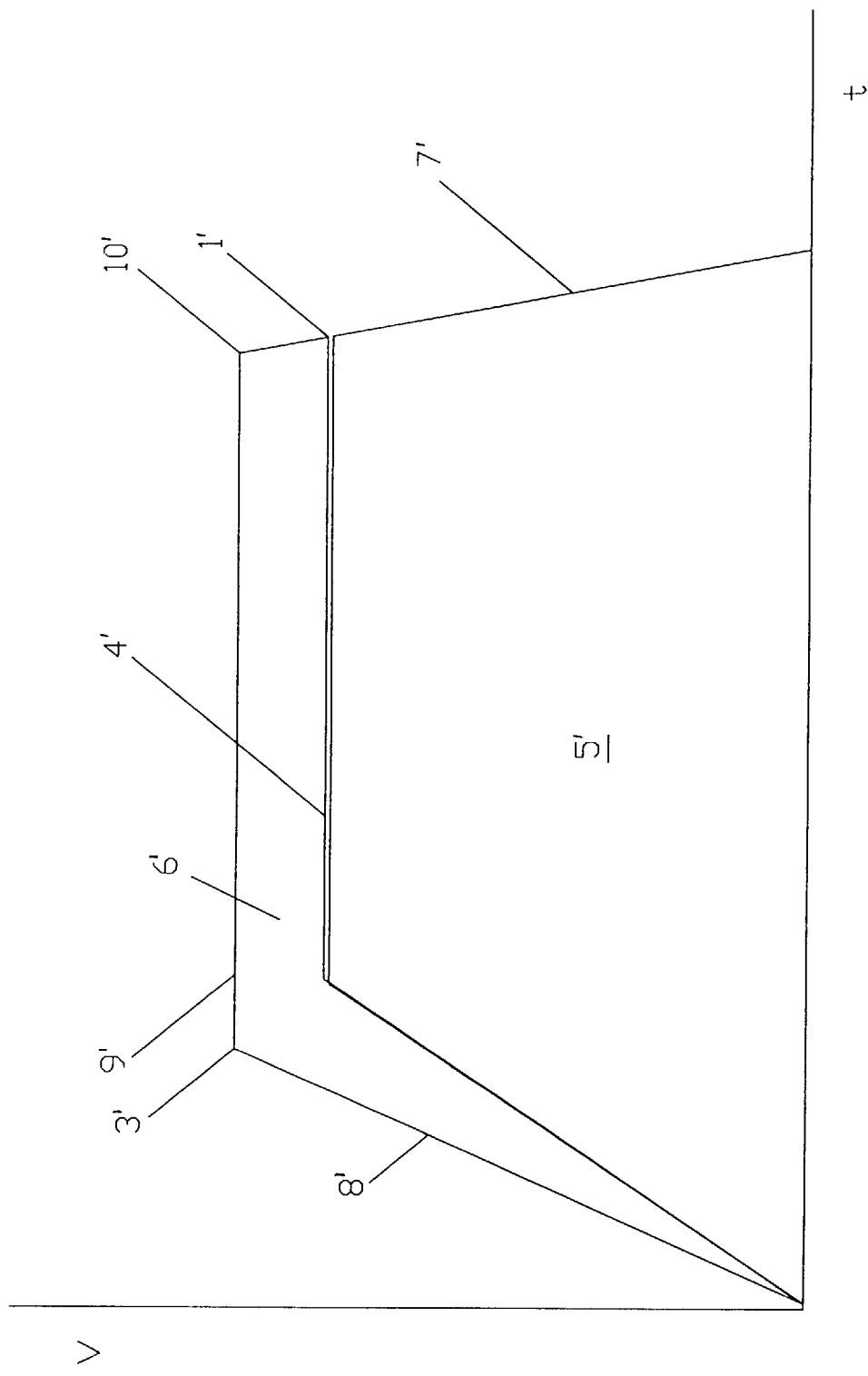
FIG. 13 is another velocity vs. time diagram.

FIG. 13 is a schematic curve of the velocity of the door panel over time.

As the result of a force exerted on at least one of the panels of the door, the door is placed in motion. On the basis of the startup ramp 8' stored in the open-loop/closed-loop microprocessor control system, the total velocity $v_m$ increases up to point 3'. The total velocity, however, does not consist solely of the velocity provided by the person operating the door, but also includes the velocity provided by the electric motor, which contributes its share to the total velocity $v_m$ with the curve 4' $v_u$. Only the remainder of the force, from the assistance velocity $v_u$ to the total velocity $v_m$, is the $\Delta v$ which must be supplied by the person. If the force applied by the person does not continue to increase, the curve makes a transition from the area of the startup ramp 8' into a uniform linear velocity of the revolving door panel, namely the velocity 9'. This velocity is maintained until, for example, force is no longer applied to the door panel. As a result of the discontinuation of the force, the total velocity $v_m$ decreases at point 10', because the person is no longer assisting the motion. The lines of velocity 9' and 4' thus intersect at point 1', and on account of the coasting ramp 7' stored in the open-loop/closed-loop microprocessor control system, the velocity of the door panel is reduced to zero. This deceleration according to the coasting ramp 7' imitates the deceleration of the panels of a purely manual revolving door.

If we consider the energy content of the areas underneath the curves, it is apparent that the kinetic energy provided by the drive system 5' is several times greater than the kinetic energy provided by the person 6'. Therefore the drive does not provide the full drive power, but only provides assistance.

On an existing revolving door of known characteristics, the Δv is constant, and can be indicated, for example, as a percentage of the assistance velocity $v_u$ which must be applied manually, and is stored in a corresponding non-volatile memory, so that it can be processed by the selected program. Regardless of the assistance velocity of the door panel which must be provided by manual force, the assistance velocity of the electric motor is a fixed component of the total velocity, so that at low and high circumferential velocities of the door panel, there is always a velocity difference, and the door does not run away from the person using the door on account of the requirement of continuous pressure on the individual door panels. Following the brief startup phase, during which a greater force must be applied, a lower force is subsequently required to move the panels than is normally the case with revolving doors which are operated purely manually. Nevertheless the person pushing the door determines how fast the door panels should move. The electric motor provides assistance for the instantaneous velocity, but the assistance velocity of the door is always below the manually required or desired speed of rotation of the door panel. This assistance mode makes the door easy to operate, because only a slight force has to be applied to actuate the door panel.

To start a stationary revolving door, as an alternative to the procedure described above, the door can also be actuated by means of a contact, switch, button, by the detection of force by means of strain gauges, or by another suitable electrical or electronic sensor system. But pressure must still then be applied to the door panel.

In this type of operation for a revolving door, it is necessary for the person using the door to maintain continuous contact with the door panel during the revolving motion of the door panel. If the direct contact is interrupted, the velocity of the door panel decreases, and it begins to coast to a stop. The coasting is produced by a deceleration curve or coasting ramp which is stored in a memory, and which imitates the coasting to a stop of a door which is operated manually.

When a constant force is exerted on the door panel, the door moves at a constant velocity. If this force is increased, thereby increasing the velocity, the Δv in the component remains the same, i.e., greater assistance is provided by the electric motor. When the manual assistance decreases, the motor support begins to turn off.

A revolving door which is operated on the basis of the method described above can be operated without safety sensors for the persons using the door. The total velocity is determined solely and exclusively by the person using the door, i.e., if there are several persons inside the space between the door panels, the person who exerts the greatest force on his or her door panel determines the total velocity. But it is also possible for another person, for whom the total velocity is too high, to exert a braking action by holding back on the door panel in front of him, thereby reducing the total velocity of the revolving door. The teaching of the invention, in accordance with at least one preferred embodiment, is thus not only that the velocity of the revolving door is controlled on the basis of the velocity determined of the person using the door, but also that there must simultaneously be continuous contact between this person and the door panel. That should generally be considered the equivalent of a manually operated revolving door.

With regard to the sensor system installed on a revolving door, a distinction must be made between a sensor system for the normal operation of a door and the safety sensor system. The operating sensor system can, for example, consist of a tachometer generator or an incremental sensor which measures the total velocity of the door panels. The safety sensor system is necessary for the safety of the persons who use a standard revolving door. This type of safety system can consist of photoelectric barriers, infrared sensors, contact mats, sensor strips, radar devices etc. All these safety sensors increase the cost of the revolving door enormously. With the operating method by the invention, it is therefore possible to eliminate all these sensors while simultaneously guaranteeing safe operation of such a door, thereby presenting the operator with an economical alternative to a revolving door operated on the basis of known methods.

It is also conceivable that a person can actuate a switch, button or sensor to set the door in motion. But in that case, it is absolutely essential to make contact with and apply pressure to one of the door panels, so that the force and thus the total velocity of the panels of the revolving door can be measured, so that the drive can provide assistance.

Some examples of the pressure sensing apparatuses and/or strain gauges which may be incorporated into an embodiment of the present invention are to be found in U.S. Pat. No. 5,241,308, entitled "Force Sensitive Touch Panel" and issued to Young on Aug. 31, 1993; U.S. Pat. No. 5,191,798, entitled "Pressure sensor" and issued to Tabata et al. on Mar. 9, 1993; U.S. Pat. No. 5,199,519, entitled "Strain Gauge Element" and issued to Polaert et al. on Apr. 6, 1993; U.S. Pat. No. 5,287,757, entitled "Strain-Gauge Transducer" and issued to Polaert et al. on Feb. 22, 1994; U.S. Pat. No. 5,303,593, entitled "Strain Gauge Distribution for Resistive Strain Gauge Pressure Sensor" and issued to Kremidas on Apr. 19, 1994; and U.S. Pat. No. 5,186,060, issued to Marlier on Feb. 16, 1993, all of these U.S. patents being hereby expressly incorporated by reference herein.

Some examples of control systems which measure operating parameters and learn therefrom are disclosed in U.S. Pat. No. 5,191,272, entitled "Method of Adjusting Gain for Motor Control" and issued to Torii et al. on Mar. 2, 1993; U.S. Pat. No. 5,223,820, entitled "Adaptive Lamp Monitor with Single Piece Sensor" and issued to Sutterlin et al. on Jun. 29, 1993; and U.S. Pat. No. 4,655,188, issued to Tomisawa et al. on Apr. 7, 1987, which U.S. patents are hereby expressly incorporated by reference herein.

Some examples of open-loop control circuits which may be incorporated in an embodiment of the present invention are to be found in U.S. Pat. No. 5,210,473, entitled "System with delay timer for motor load equalization" and issued to Backstrand on May 11, 1993; U.S. Pat. No. 5,320,186, entitled "Draft Control System with Closed Loop Drop/Raise Rate Control" and issued to Strosser et al. on Jun. 14, 1994; and U.S. Pat. No. 5,369,342, entitled "Predictive Electric Motor Positioning Device, Calibration System Therefor" and issued to Rudzewicz et al. on Nov. 29, 1994, which U.S. patents are hereby incorporated by reference herein.

Some examples of closed-loop control circuits which may be incorporated in an embodiment of the present invention are to be found in U.S. Pat. No. 5,189,605, entitled "Control and Hydraulic System for a Liftcrane" and issued to Zuehlke et al. on Feb. 23, 1993; U.S. Pat. No. 5,223,072, entitled "Intelligent Servo-Controlled Fiber Placement Machine Tensioner" and issued to Brockman et al. on Jun. 29, 1993; and U.S. Pat. No. 5,252,901, entitled "System for Controlling Locomotion of Legged Walking Robot" and issued to Ozawa et al. on Oct. 12, 1993, which U.S. patents are hereby incorporated by reference herein.

Some examples of look up tables accessed by computers or microprocessors which may be incorporated in an embodiment of the present invention are to be found in U.S. Pat. No. 5,284,116, entitled "Vehicle Management Computer" and issued to Richeson, Jr. on Feb. 8, 1994; U.S. Pat. No. 5,359,325, entitled "Automatic Monitoring System for Airfield Lighting Systems" and issued to Ford et al. on Oct. 25, 1994; and U.S. Pat. No. 5,371,537, entitled "Method and Apparatus for Automatically Calibrating a CRT Display" and issued to Bohan et al. on Dec. 6, 1994, which U.S. patents are hereby incorporated by reference herein.

Some examples of power modifying systems which may be incorporated into an embodiment of the present invention are to be found in U.S. Pat. No. 5,355,315 issued to Daido et al. on Oct. 11, 1994; U.S. Pat. No. 5,224,564 issued to Duffy on Jul. 6, 1993; U.S. Pat. No. 5,218,769 issued to Tranchon on Jun. 15, 1993; U.S. Pat. No. 5,255,755 issued to Fu on Oct. 26, 1993; U.S. Pat. No. 5,201,818 issued to Nishimoto on Apr. 13, 1993; and U.S. Pat. No. 5,205,371 issued to Karnopp on Apr. 27, 1993, which U.S. patents are hereby expressly incorporated by reference herein.

One feature of an invention resides broadly in the operating method for the operation of a revolving door, the panels of which are driven by a drive motor which controls or regulates the operation according to an sequential program by means of an open-loop/closed-loop microprocessor control system of a drive unit, characterized by the following features: that to start the revolving door, at least one person must apply a manual force in the direction of rotation on at least one of the panels 10, 11, 12, 13 of the revolving door, that during the rotational movement of the door panels 10, 11, 12, 13, a continuous pressure must be maintained on at least one of the door panels 10, 11, 12, 13, that this force is proportional to the speed of revolution of the door panels 10, 11, 12, 13, that the drive motor 14 is regulated so that it only provides a boost for the drive force necessary to achieve the rotational velocity, whereby the total force is composed of the manual force and the force applied by the drive unit 33.

Another feature of an invention resides broadly in the operating method characterized by the fact that the speed of rotation of the door panels 10, 11, 12, 13 is measured, and the result is transmitted for processing to the open-loop/closed-loop microprocessor control system 32.

Yet another feature of an invention resides broadly in the operating method characterized by the fact that the current consumption of the drive motor 14 is measured, and the measurement result is fed into a computer program of the open-loop/closed-loop microprocessor control system 32.

Still another feature of an invention resides broadly in the operating method characterized by the fact that the startup of the revolving door is initiated by the activation of a sensor system or switch, following which at least one person must exert a manual force in the direction of rotation on at least one of the door panels 10, 11, 12, 13.

A further feature of an invention resides broadly in the operating method characterized by the fact that after the startup of the door panels 10, 11, 12, 13, the increasing speed of revolution corresponds to a startup ramp 8, the curve of which is determined by the programs run in the drive unit 33, but always remains below the startup ramp 8.

Another feature of an invention resides broadly in the operating method characterized by the fact that if the manual force exerted on the door panel is interrupted or ceases, the current consumption of the drive motor 14 increases, and a coasting ramp 7 is activated if it exceeds a value specified by a sequential program.

Yet another feature of an invention resides broadly in the operating method characterized by the fact that the coasting ramp 7 imitates the coasting of a revolving door which is operated purely manually.

Still another feature of an invention resides broadly in the operating method characterized by the fact that the coasting ramp 7 is realized by a pulse width modulation.

A further feature of an invention resides broadly in the operating method characterized by the fact that if, during the coasting ramp 7, a manual force is once again applied to the door, the drive motor 14 supplies the necessary booster force as a function of the level of the manual force applied to the door.

Another feature of an invention resides broadly in the operating method characterized by the fact that the speed of revolution of the panels 10, 11, 12, 13 is measured by means of an incremental sensor.

Yet another feature of an invention resides broadly in the operating method characterized by the fact that the speed of revolution of the panels 10, 11, 12, 13 is measured by means of a tachometer generator.

Still another feature of an invention resides broadly in the operating method characterized by the fact that a positive change in the level of force on at least one of the panels 10, 11, 12, 13 is detected as an indicator of an increase in the peripheral velocity, and the drive unit 33 supplies a greater booster force.

A further feature of an invention resides broadly in the operating method characterized by the fact that on the occasion of the initial manual activation of the revolving door, the door performs a learning cycle, and thereby measures the relevant factors of the operation of the revolving door and stores them in a non-volatile memory.

Another feature of an invention resides broadly in the operating method characterized by the fact that the booster force is determined on the basis of the parameters of the operation of the revolving door, and is permanently monitored by the open-loop/closed-loop microprocessor control system 32.

Yet another feature of an invention resides broadly in the operating method characterized by the fact that the manual force during the operating phase is always less than the force required during the start-up phase 8 to reach the peripheral velocity.

Still another feature of an invention resides broadly in the operating method characterized by the fact that the speed of rotation or change in the velocity of the panels 10, 11, 12, 13 produced by a person is measured, and this speed of rotation or change in speed is used as an indicator for the open-loop/closed-loop microprocessor control system 32 of the drive unit 33, and the drive unit 33 provides a servo power boost which is always less than the total speed.

A further feature of an invention resides broadly in the operating method characterized by the fact that at least one of the panels 10, 11, 12, 13 is placed in rotation by a person, and the kinetic energy contained in the revolving panels 10, 11, 12, 13 is measured, and the measurement is transmitted to an open-loop/closed-loop microprocessor control system 32 of the drive unit 33.

Another feature of an invention resides broadly in the operating method characterized by the fact that the kinetic energy is used as an indicator for the regulation of the drive motor 33, whereby the drive motor 33 provides only a servo power boost which is always less than the total kinetic energy.

Yet another feature of an invention resides broadly in the operating method characterized by the fact that in the vicinity of the revolving door, there is no safety sensor system of the type otherwise required for the safety of the persons using the door.

There is disclosed herein an operating method for the operation of a revolving door, the revolving panels of which are driven by an electric motor, and which is controlled and regulated in terms of its propulsion and revolution by a microprocessor open-loop or closed-loop control system respectively, but in which the electric motor does not apply the entire propulsion force, but only a portion of it, and the person who is passing through the revolving door must exert a force on the door in the form of continuous contact with the revolving door panel, which force is not applied by the electric motor, to maintain the speed of rotation of the revolving panel. The speed of rotation of the revolving panel is preferably measured by means of an incremental sensor. The revolving door panels, which are mounted centrally, are located inside two drum walls which, as a rule, are interrupted by entrances and exits which are located diametrically opposite one another. A conventional electronic safety system, e.g., sensors etc., is normally essential for the safe operation of such a revolving door.

For the panels of a revolving door which is propelled by an electric motor, a complex and expensive system of sensors is generally necessary to ensure the safety of the persons using the door. This system can consist of switch mats, sensor strips, light-beam curtains, infrared and radar sensors and photoelectric barriers. All these sensors, in themselves, make possible the safe operation of such a revolving door. But because such safety sensor systems are increasingly integrated into the revolving door itself, it can happen that the normal operation of the door can be interfered with by the functioning or even malfunctioning of all these different safety systems. That is, there are a good many emergency shutdowns of the revolving door, which generally require manual intervention by a person trained in maintenance and repair of the door.

A known revolving door of the type described above is disclosed in European Patent 0 340 771 A1. The individual door panels are fastened in a central area and are driven by a drive motor.

German Patent 39 34 662 A1 describes a revolving door which is provided with a safety circuit and an electric inertial mass which can be electrically decelerated or stopped. A programmable open-loop control system equipped with a microprocessor controls the operation of the door and also makes it possible for the safety sensors and devices to guarantee a smooth operation of the door.

In addition to the revolving doors described above, also known are doors which are not equipped with a drive motor. These manually operated revolving doors are generally of limited diameter, since the person using the door must manually set the panels of the revolving door in motion by pushing them. But such an effort is difficult or even impossible for older persons or physically handicapped persons. On account of the absence of a drive systems, these manually operated revolving doors do not have any type of safety equipment, but they are also severely restricted in terms of size.

The operating method for the open-loop and closed-loop control and regulation of a motor-driven revolving door which is disclosed herein makes it possible to eliminate the safety sensors or safety devices for the user which are otherwise necessary for the operation of such a door. An additional basic requirement is that it must be possible for physically handicapped persons and for older people to operate this revolving door without having to exert a great deal of force.

This object can be accomplished if the door is driven by an open-loop/closed loop microprocessor control system and operates with the electric propulsion system only in a quasi-assistance mode or servo operation, whereby the person using the door must also contribute to the power assist. To set a revolving door of this type in motion, a manual force in the direction of movement must be applied by the person using the door on at least one of the panels of the revolving door. As a result of this manual force, the panels of the door are set in motion, and thus an acceleration is transmitted to the open-loop/closed loop microprocessor control system by the measurement results transmitted by the incremental sensor. The open-loop microprocessor control system thereby recognizes that the panels are experiencing a rotational motion, and then makes certain that the electric motor drive assists this rotational velocity. This assistance can be explained as follows: From the measured total velocity $v_m$ of the panel of the door, or from the accelerating power of the door panel, caused by the manual force (actuation force) exerted by the person using the door, the open-loop/closed loop microprocessor control system calculates an assistance velocity $v_u$, which is less than the total velocity $v_m$ by an amount $\Delta v$. The following formula results for the assistance velocity $v_u$ of the panels of the revolving door:

$$v_u = v_m - \Delta v$$

The total velocity $v_m$ of the panels of the revolving door is composed of the assistance velocity $v_u$ produced by the electric motor, and the difference $\Delta v$ from the manual force and thus the velocity of the panel $v_m$, whereby after the brief start-up phase of the door panel, only a significantly lower force needs to be applied by the user, which corresponds to the velocity $\Delta v$. It can thus be said that the manual force is proportional to the velocity $\Delta v$. When a large force is applied, the velocity of the door panel is high, and when a small force is applied, it is low. This relationship makes it clear that the total velocity of the door panels is a function of two components, the manual velocity and the assistance velocity provided by the electric motor. As a result of these requirements, it is possible to keep the door panel from running away from the person, because continuous contact with the door panel is necessary to keep the door panel in motion.

To create a control system in which the electric motor operates in an assistance mode, it is necessary for the total velocity of the door panel $v_m$ to be measured by the incremental sensor, and processed on the basis of a selected program in the open-loop/closed loop microprocessor control system.

It is apparent that $v_u$ will always be less than the total velocity $v_m$. The value of $\Delta v$ can thereby be set, so that it is possible to regulate or to control the revolving door as a function of the site where it is installed, so that the assistance mode is set to a level which is appropriate for the persons using the door. Such a measure may be necessary in particular on doors which have different diameters.

Thus, there has been disclosed an operating method for the operation of a revolving door, in which an electric motor provides an assistance mode which supplies assistance so that the manual force applied by a person to a panel of the revolving door is reduced by a $\Delta v$, and thus the person using the door need only apply a slight additional force.

In further recapitulation, there is disclosed herein apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising: means for sensing the magnitude of at least one of: a force applied by the user to at least one of said plurality of door panels; and a rotational velocity imparted by the user to said revolving door; and means for operating said control circuit to cause said drive motor to supply a rotational torque to said revolving door that is substantially proportional to said sensed magnitude of said at least one of said user applied force and said user imparted velocity.

There is also disclosed herein apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising: means for sensing the magnitude of a user supplied parameter; and means for operating said control circuit to cause said drive motor to supply a rotational torque to said revolving door that is substantially proportional to said sensed magnitude of said user supplied parameter.

Further examples of general components relating to revolving doors may be found in the following patent publications: Federal Republic of Germany 4 124 282 (Dorma GbmH); Federal Republic of Germany 3 934 662 (Gallenschutz Metallbau GmbH); Federal Republic of Germany 4 207 705 (Dorma GbmH); U.S. Pat. No. 4,581,849 (Schwarz); U.S. Pat. No. 4,154,023 (Carroll); and U.S. Pat. No. 4,952,080 (Boiucaner et al.).

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 44 03 565.9, filed on Feb. 7, 1994, and International Patent Application No. PCT/DE94/01543, filed on Dec. 24, 1994, having inventors Jürgen Stark and Steffen Strunk, and DE-OS P 44 03 565.9 and DE-PS P 44 03 565.9 and International Application No. PCT/DE94/01543, are hereby incorporated by reference as if set forth in their entirety herein.

Other corresponding foreign and international patent publication applications, namely, Federal Republic of Germany Patent Application No. P 44 15 164.0, filed on May 2, 1994, and International Application No. PCT/DE95/00169, filed Feb. 10, 1995, having inventor Ulrich Theile, and DE-OS P 44 15 164.0 and DE-PS P 44 15 164.0 and International Application No. PCT/DE95/00169, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A method for testing the operation of an automatic door, the automatic door including at least one movable door panel and a drive system for moving the at least one movable door panel to permit access through the automatic door, wherein the drive system includes a drive motor, the automatic door includes a control apparatus for controlling the current supplied to the drive motor, and the control apparatus includes a current limiting apparatus for limiting the current supplied to the drive motor during a normal operation of the automatic door to a normal operating motor current limit, said method comprising the steps of:

a) providing memory means for storing data;

b) storing in said memory means at least one characteristic of the drive system corresponding to the beginning of at least one movement from rest of the at least one movable door panel;

c) determining at least one operational characteristic of the drive system, to provide a determined operational characteristic of the drive system, at the beginning of each movement from rest of the at least one movable door panel;

d) comparing said determined operational characteristic of the drive system as determined in step c) to said at least one characteristic of the drive system corresponding to the beginning of at least one movement from rest of the at least one movable door panel stored in said memory means;

e) if said determined operational characteristic as determined in step c) is outside of at least one given range of said at least one characteristic of the drive system corresponding to the beginning of at least one movement from rest of the at least one movable door panel stored in said memory means in step b), then at least temporarily preventing the drive system from moving the at least one movable door panel;

said step of storing in said memory means at least one characteristic of the drive system comprising the step of setting a desired value of the motor current to a level that is greater than said normal operating motor current limit;

operating the drive motor;

said step of determining at least one operational characteristic of the drive system comprising the step of determining the drive motor current during a first time period $t_1$; and said step of at least temporarily preventing the drive system from moving the at least one movable door panel comprising the steps of:

verifying that the drive motor current exceeds said normal operating motor current limit during said first time period $t_1$;

setting a desired value of the motor current to a level that is less than said normal operating motor current limit;

determining the drive motor current during a second time period $t_2$; and if the determined drive motor current does not: (1) have a value that substantially exceeds said normal operating motor current limit during said first time period $t_1$; and (2) have a value that is substantially less than or substantially equal to said normal operating current motor limit during said second time period $t_2$, then at least temporarily preventing the drive system from moving the at least one movable door panel.

2. A method for testing the operation of an automatic door according to claim 1, said method comprising the additional steps of:
if the determined drive motor current has a value that substantially exceeds said normal operating motor current limit after the expiration of said first time period $t_1$, then at least temporarily preventing the drive system from moving the at least one movable door panel; and
if the determined drive motor current has a value that is substantially less than or substantially equal to said normal operating current after the expiration of said second time period $t_2$, then at least temporarily preventing the drive system from moving the at least one movable door panel.

3. A method for testing the operation of an automatic door according to claim 2, said method comprising the additional steps of:
operating the automatic door during a learning cycle;
during said learning cycle, determining at least one of:
a drive system current characteristic of the automatic door;
a drive system voltage characteristic of the automatic door; and
a drive system speed characteristic of the automatic door;
and
storing said at least one of said determined drive system current characteristic, said drive system voltage characteristic and said drive system speed characteristic in said memory means.

4. A method for testing the operation of an automatic door according to claim 3, wherein the automatic door additionally includes a microprocessor for controlling the drive motor, and wherein said step of storing in said memory means said at least one characteristic of the drive system comprises the step of storing in said memory means data representative of a motor torque curve of the drive motor.

5. A method for testing the operation of an automatic door according to claim 4, wherein said step of storing in said memory means data representative of a motor torque curve of the drive motor comprises the step of storing said data representative of a motor torque curve of the drive motor in a non-volatile memory element.

6. A method for testing the operation of an automatic door according to claim 5, wherein said step of storing in said non-volatile memory element data representative of a motor torque curve of the drive motor comprises the step of storing said data representative of a motor torque curve of the drive motor in an electrically erasable programmable read only memory element.

7. A method for testing the operation of an automatic door according to claim 6, said method comprising the further step of controlling the operation of the drive motor by pulse width modulation.

8. A method for testing the operation of an automatic door according to claim 7, said method further comprising the additional steps of;
during the operation of the automatic door during said learning cycle, determining and storing in said memory means each of said drive system current characteristic, said drive system voltage characteristic and said drive system speed characteristic.

9. A method for testing the operation of an automatic door according to claim 8, said method comprising the additional steps of:

activating a sequence of movement of the at least one movable door panel by at least one of: a continuous signal, and at least one sensor signal;
providing a programmable electronic control unit, said programmable electronic control unit comprising said microprocessor, said microprocessor comprising said control apparatus for controlling the current supplied to the drive motor, said microprocessor additionally comprising said current limiting apparatus; and
determining the forces on at least one portion of the at least one movable door panel.

10. An apparatus for testing the operation of an automatic door, the automatic door including at least one displaceable door panel and a drive system for displacing the door panel to permit access through the automatic door, said apparatus comprising:
memory means for storing data;
means for storing in said memory means at least one characteristic of the drive system;
means for determining, prior to each displacement of the at least one displaceable door panel, at least one operational characteristic of the drive system;
means for comparing said determined operational characteristic of the drive system to said at least one characteristic of the drive system stored in said memory means;
means for at least temporarily preventing the drive system from displacing the at least one displaceable door panel if said determined operational characteristic is outside of at least one given range of said at least one characteristic of the drive system stored in said memory means;
said means for storing comprising means for setting a desired value of the motor current to a level that is greater than a normal operating motor current limit;
means for operating a drive motor;
said means for determining comprising means for determining the drive motor current during a first time period $t_1$;
said means for comparing comprising means for verifying that the drive motor current exceeds said normal operating motor current limit during said first time period $t_1$;
said means for storing comprising means for setting a desired value of the motor current to a level that is less than said normal operating motor current limit;
said means for determining comprising means for determining the drive motor current during a second time period $t_2$; and
said means for at least temporarily preventing the drive system from displacing the at least one displaceable door panel comprising means for checking if the determined drive motor current does not: (1) have a value that substantially exceeds said normal operating motor current limit during said first time period $t_1$; and (2) have a value that is substantially less than or substantially equal to said normal operating current motor limit during said second time period $t_2$, then at least temporarily preventing the drive system from displacing the at least one displaceable door panel.

11. An apparatus for testing the operation of an automatic door according to claim 10, said apparatus additionally comprising:
means for, if the determined drive motor current has a value that substantially exceeds said normal operating motor current limit after the expiration of said first time period $t_1$, then at least temporarily preventing the drive system from displacing the at least one displaceable door panel; and means for, if the determined drive motor current has a value that is substantially less than or substantially equal to said normal operating current after the expiration of said second time period $t_2$, then at least temporarily preventing the drive system from displacing the at least one displaceable door panel.

12. An apparatus for testing the operation of an automatic door according to claim 11, said apparatus additionally comprising:

means for operating the automatic door during a learning cycle;

means for, during said learning cycle, determining at least one of:
  a drive system current characteristic of the automatic door;
  a drive system voltage characteristic of the automatic door; and
  a drive system speed characteristic of the automatic door;
and
  means for storing said at least one of said determined drive system current characteristic, said drive system voltage characteristic and said drive system speed characteristic in said memory means.

13. An apparatus for testing the operation of an automatic door according to claim 12, wherein the automatic door additionally includes a microprocessor for controlling the drive motor, and wherein said means for storing in said memory means said at least one characteristic of the drive system comprises means for storing in said memory means data representative of a motor torque curve of the drive motor.

14. An apparatus for testing the operation of an automatic door according to claim 13, wherein said memory means comprises at least one of: a non-volatile memory element and an electrically erasable programmable read only memory element.

15. An apparatus for testing the operation of an automatic door according to claim 14, said apparatus additionally comprising means for controlling the operation of the drive motor by pulse width modulation.

16. A method for testing the operation of an automatic door, the automatic door including at least one displaceable door panel and a drive system for displacing the door panel to permit access through the automatic door, said method comprising the steps of:

providing memory means for storing data;

storing in said memory means at least one characteristic of the drive system;

prior to each displacement of the at least one displaceable door panel, determining at least one operational characteristic of the drive system;

comparing said determined operational characteristic of the drive system to said at least one characteristic of the drive system stored in said memory means;

if said determined operational characteristic is outside of at least one given range of said at least one characteristic of the drive system stored in said memory means, then at least temporarily preventing the drive system from displacing the at least one displaceable door panel;

said step of storing in said memory means at least one characteristic of the drive system comprising the step of setting a desired value of said at least one characteristic to a level that is greater than a normal operating state of said at least one characteristic of the drive system;

operating the drive motor;

said step of determining at least one operational characteristic of the drive system comprising the step of determining said at least one characteristic during a first time period $t_1$; and said step of at least temporarily preventing the drive system from displacing the at least one displaceable door panel comprising the steps of:
  verifying that said at least one characteristic exceeds said normal operating state of said at least one characteristic of said drive system during said first time period $t_1$;
  setting a desired value of said at least one characteristic to a level that is less than said normal operating state of said at least one characteristic of the drive system;
  determining said at least one characteristic during a second time period $t_2$; and
  at least temporarily preventing the drive system from displacing the at least one displaceable door panel if the determined operational characteristic does not: (1) have a value that substantially exceeds said normal operating state of said at least one characteristic of the drive system during said first time period $t_1$; and (2) have a value that is one of substantially less than and substantially equal to said normal operating state of said at least one characteristic of the drive system during said second time period $t_2$.

17. The method for testing the operation of an automatic door according to claim 16, said method further comprising:

said step of storing in said memory means at least one characteristic of the drive system further comprising one of a) and b):
  a) programming said at least one characteristic of the drive system into said memory means; and
  b) measuring said at least one characteristic of the drive system during a learning cycle and storing said at least one characteristic in said memory means; and regulating a drive motor of the drive system by pulse width modulation.

* * * * *